US008019096B2

(12) United States Patent
Sander et al.

(10) Patent No.: US 8,019,096 B2
(45) Date of Patent: Sep. 13, 2011

(54) ELECTRONIC DEVICE AND EXTERNAL EQUIPMENT WITH CONFIGURABLE AUDIO PATH CIRCUITRY

(75) Inventors: Wendell B. Sander, Los Gatos, CA (US); Jeffrey Terlizzi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/481,556

(22) Filed: Jun. 9, 2009

(65) Prior Publication Data

US 2010/0260341 A1 Oct. 14, 2010

Related U.S. Application Data

(60) Provisional application No. 61/168,539, filed on Apr. 10, 2009.

(51) Int. Cl.
*H02B 1/00* (2006.01)
*H04R 1/10* (2006.01)
*H04R 1/02* (2006.01)
*H04R 3/00* (2006.01)

(52) U.S. Cl. ............. 381/123; 381/74; 381/91; 381/122

(58) Field of Classification Search .................... 381/91, 381/74, 123, 122, 332, 334, 92, 77, 80, 81, 381/72; 379/433.05
See application file for complete search history.

(56) References Cited

U.S. PATENT DOCUMENTS 3,648,249 A 3/1972 Goldsberry
3,746,991 A 7/1973 Gautney
4,338,846 A 7/1982 Pogoda
4,351,060 A * 9/1982 Treiber ......................... 375/230
5,345,510 A 9/1994 Singhi
5,388,496 A 2/1995 Miller
RE35,536 E 6/1997 Irissou et al.
6,745,014 B1 6/2004 Seibert et al.
(Continued)

FOREIGN PATENT DOCUMENTS

EP 1 976 246 10/2008
(Continued)

OTHER PUBLICATIONS

"TRS connector" Wikipedia, [online], retrieved Jul. 28, 2008, <http://en.wikipedia.org/wiki/TRS_connector>.
Sander et al., U.S. Appl. No. 61/020,988, filed Jan. 14, 2008.

(Continued)

*Primary Examiner* — Xu Mei
*Assistant Examiner* — Douglas Suthers
(74) *Attorney, Agent, or Firm* — Treyz Law Group; G. Victor Treyz; David C. Kellogg

(57) ABSTRACT

Electronic devices and accessories such as headsets for electronic devices are provided. A microphone may be included in an accessory to capture sound for an associated electronic device. Buttons and other user interfaces may be included in the accessories. An accessory may have an audio plug that connects to a mating audio jack in an electronic device, thereby establishing a wired communications path between the accessory and the electronic device. Path configuration circuitry may be used to selectively configure the path between the electronic device and accessory to support different operational modes. Analog audio lines in the wired path may convey left and right channel analog audio channels. When it is desired to convey power over the wired path, one of the analog audio channel lines may be converted to a power line. Audio functionality may be retained by simultaneously converting a unidirectional line into a bidirectional line using hybrids.

24 Claims, 10 Drawing Sheets

U.S. PATENT DOCUMENTS

| | | | |
|---|---|---|---|
| 6,988,905 | B2 | 1/2006 | Corey et al. |
| 7,110,799 | B1 | 9/2006 | Willins et al. |
| 7,349,546 | B2 | 3/2008 | Ganton |
| 2001/0053228 | A1 * | 12/2001 | Jones ........................... 381/71.6 |
| 2002/0032047 | A1 | 3/2002 | Ingbir |
| 2005/0190306 | A1 | 9/2005 | Lee |
| 2005/0201568 | A1 * | 9/2005 | Goyal ............................ 381/74 |
| 2006/0009868 | A1 | 1/2006 | Park |
| 2006/0223581 | A1 | 10/2006 | Jacobs |
| 2007/0004472 | A1 | 1/2007 | Gitzinger |
| 2007/0178947 | A1 | 8/2007 | Kim |
| 2007/0225049 | A1 | 9/2007 | Andrada |
| 2008/0032753 | A1 | 2/2008 | Nho |
| 2008/0039072 | A1 | 2/2008 | Bloebaum |
| 2008/0164994 | A1 | 7/2008 | Johnson et al. |

FOREIGN PATENT DOCUMENTS

| | | | |
|---|---|---|---|
| WO | 9957937 | A1 | 11/1999 |
| WO | 03056790 | A1 | 7/2003 |
| WO | 2008085929 | A2 | 7/2008 |

OTHER PUBLICATIONS

Sander et al., U.S. Appl. No. 12/203,876, filed Sep. 3, 2008.
Sander et al., U.S. Appl. No. 12/203,877, filed Sep. 3, 2008.
Sander et al., U.S. Appl. No. 12/203,879, filed Sep. 3, 2008.
Sander et al., U.S. Appl. No. 12/203,880, filed Sep. 3, 2008.
Sander et al., U.S. Appl. No. 12/203,871, filed Sep. 3, 2008.
Sander et al., U.S. Appl. No. 12/203,883, filed Sep. 3, 2008.
Sander et al., U.S. Appl. No. 12/203,886, filed Sep. 3, 2008.
Sander et al., U.S. Appl. No. 12/203,873, filed Sep. 3, 2008.
Sander et al., U.S. Appl. No. 12/481,555, filed Jun. 9, 2009.

* cited by examiner

ELECTRONIC DEVICE AND EXTERNAL EQUIPMENT WITH CONFIGURABLE AUDIO PATH CIRCUITRY

This application claims the benefit of provisional patent application No. 61/168,539, filed Apr. 10, 2009, which is hereby incorporated by reference herein in its entirety.

BACKGROUND

Electronic devices such as computers, media players, and cellular telephones typically contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used electronic devices such as notebook computers and media players, because audio connectors such as these are relatively compact.

Audio connectors that are commonly used for handling stereo audio have a tip connector, a ring connector, and a sleeve connector and are sometimes referred to as three-contact connectors or TRS connectors. In devices such as cellular telephones, it is often necessary to convey microphone signals from the headset to the cellular telephone. In arrangements in which it is desired to handle both stereo audio signals and microphone signals, an audio connector typically contains an additional ring terminal. Audio connectors such as these have a tip, two rings, and a sleeve and are therefore sometimes referred to as four-contact connectors or TRRS connectors.

In a typical microphone-enabled headset, a bias voltage is applied to the microphone from the electronic device over the microphone line. The microphone in the headset generates a microphone signal when sound is received from the user (i.e., when a user speaks during a telephone call). Microphone amplifier circuitry and analog-to-digital converter circuitry in the cellular telephone can convert microphone signals from the headset into digital signals for subsequent processing.

Some users may wish to operate their cellular telephones or other electronic devices remotely. To accommodate this need, some modern microphone-enabled headsets feature a button. When the button is pressed by the user, the microphone line is shorted to ground. Monitoring circuitry in a cellular telephone to which the headset is connected can detect the momentary grounding of the microphone line and can take appropriate action. In a typical scenario, a button press might be used be used to answer an incoming telephone or might be used skip tracks during playback of a media file.

In conventional arrangements, it can be difficult or impossible to convey desired signals over an audio jack and plug. For example, it may not be possible to power circuitry in an accessory because there are no appropriate pathways available for carrying power.

SUMMARY

Electronic devices and external equipment such as headsets and other accessories may operate in a variety of operating modes. For example, a headset may sometimes operate in a mode in which no external source of power is required and may, at other times, require external power. In a typical scenario, a headset may contain ambient noise reduction circuitry that requires a certain amount of power to operate. When ambient noise reduction functions are desired, the headset must receive sufficient power to operate the ambient noise reduction circuitry from an electronic device or must use a local battery.

Electronic devices and external equipment may be connected by a wired path. With one suitable arrangement, an electronic device may contain a female audio connector into which external equipment may be plugged using a male audio connector. The audio connectors may contain a microphone terminal, a ground terminal, and one or more signal terminals that are typically used for handling analog audio signals.

Circuitry in the electronic device and external equipment may be adjusted to configure the paths in the wired path. When, for example, it is desired to use the audio connector signal terminals to handle analog audio, one of the signal terminals may be provided with a first channel of stereo audio and another of the signal terminals may be provided with a second channel of audio. The microphone terminal can be used to convey analog microphone signals and optional control signals to the electronic device from the accessory. When it is desired to supply power to the accessory, one of the audio signal terminals can be converted into a direct-current voltage terminal to supply power. The audio channel that would otherwise have been conveyed over the audio signal terminal can be rerouted through the microphone terminal. To support this type of path reconfiguration, the electronic device and accessory may be provided with hybrid circuits. When the hybrids are switched into use, the microphone line is converted into a bidirectional line and can be used to simultaneously handle outgoing analog audio signals and incoming microphone signals.

In general, the audio connectors may have any suitable number of contacts (e.g., three, four, etc.) and there may be any suitable number of associated conductive lines in the wired communications path between the electronic device and the external equipment to which the electronic device is connected. The circuitry in the electronic device and external equipment may be configured to support any suitable number of different operating modes (e.g., two, three, four, five, six, or more than six different configurations may be supported if desired). In some configurations, some or all of the lines may serve as unidirectional paths, whereas in other configurations, some or all of the lines may serve as bidirectional paths. By adjusting the configuration of the wired path and the associated signal assignments used in routing signals through the path, it is possible to support a variety of different communications schemes. Each scheme may, in general, involve transmission of a different set of analog signals, power signals (e.g., direct-current voltages for powering circuits or recharging batteries), digital signals, etc.

Further features of the invention, its nature and various advantages will be more apparent from the accompanying drawings and the following detailed description of the preferred embodiments.

DETAILED DESCRIPTION

Figure 1:
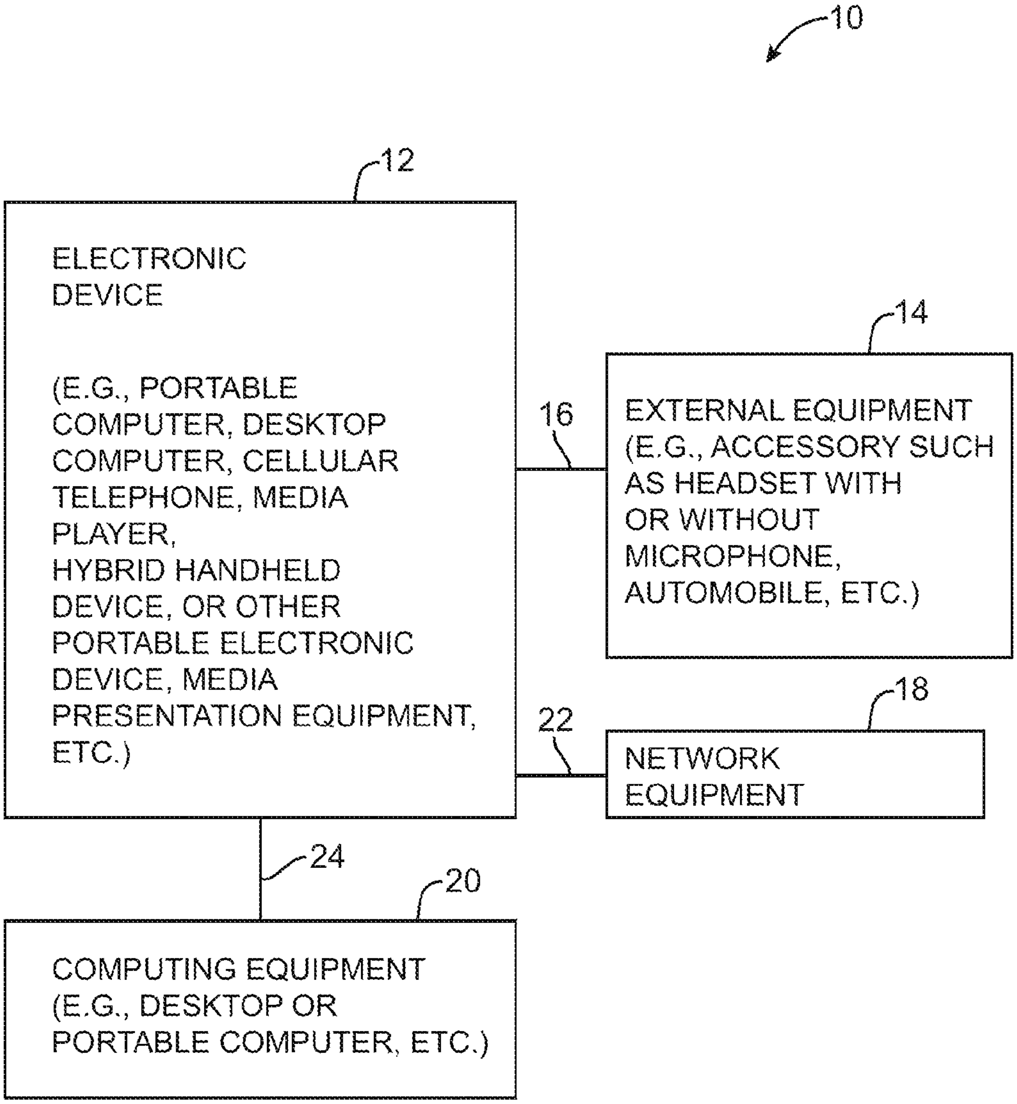
FIG. 1 is a schematic diagram of an illustrative electronic device in communication with an accessory such as a headset or other external equipment in a system in accordance with an embodiment of the present invention.

Electronic components such as electronic devices and other equipment may be interconnected using wired and wireless paths. For example, a wireless path may be used to connect a cellular telephone with a wireless base station. Wired paths may be used to connect electronic devices to equipment such as computer peripherals and audio accessories. As an example, a user may use a wired path to connect a portable music player to a headset.

Electronic devices that may be connected to external equipment using wired paths include desktop computers and portable electronic devices. The portable electronic devices may include laptop computers and small portable computers of the type that are sometimes referred to as ultraportables. The portable electronic devices may also include somewhat smaller portable electronic devices such as wrist-watch devices, pendant devices, and other wearable and miniature devices.

The electronic devices that are connected to external equipment using wired paths may also be handheld electronic devices such as cellular telephones, media players with wireless communications capabilities, handheld computers (also sometimes called personal digital assistants), remote controllers, global positioning system (GPS) devices, and handheld gaming devices. The electronic devices may also be hybrid devices that combine the functionality of multiple conventional devices. Examples of hybrid electronic devices include a cellular telephone that includes media player functionality, a gaming device that includes a wireless communications capability, a cellular telephone that includes game and email functions, and a portable device that receives email, supports mobile telephone calls, has music player functionality, and supports web browsing. These are merely illustrative examples.

An example of external equipment that may be connected to such electronic devices by a wired path is an accessory such as a headset. A headset typically includes a pair of speakers that a user can use to play audio from the electronic device. The accessory may have a user control interface such as one or more buttons. When a user supplies input, the input may be conveyed to the electronic device. As an example, when the user presses a button on the accessory, a corresponding signal may be provided to the electronic device to direct the electronic device to take an appropriate action. Because the button is located on the headset rather than on the electronic device, a user may place the electronic device at a remote location such as on a table or in a pocket, while controlling the device using conveniently located headset buttons.

The external equipment that is connected by the wired path may also include equipment such as a tape adapter. A tape adapter may have an audio plug on one end and a cassette at the other end that slides into a tape deck such as an automobile tape deck. Equipment such as a tape adapter may be used to play music or other audio over the speakers associated with the tape deck. Audio equipment such as the stereo system in a user's home or automobile may also be connected to an electronic device using a wired path. As an example, a user may connect a music player to an automobile sound system using a three-pin or four-pin audio connector (e.g., TRS or TRRS connectors).

In a typical scenario, the electronic device that is connected to the external equipment with the wired path may produce audio signals. These audio signals may be transmitted to the external equipment in the form of analog audio (as an example). The external equipment may include a microphone. Microphone signals (e.g., analog audio signals corresponding to a user's voice or other sounds) may be conveyed to the electronic device using the wired path. The wired path may also be used to convey other signals such as power signals and control signals. Digital data may be conveyed if desired. The digital data may include, for example, control signals, audio, display information, etc.

If the electronic device is a media player and is in the process of playing a song or other media file for the user, the electronic device may be directed to pause the currently playing media file when the user presses a button associated with attached external equipment. As another example, if the electronic device is a cellular telephone with media player capabilities and the user is listening to a song when an incoming telephone call is received, actuation of a button on an accessory or other external equipment by the user may direct the electronic device to answer the incoming telephone call. Actions such as these may be taken, for example, while the media player or cellular telephone is stowed within a user's pocket.

Accessories such as headsets are typically connected to electronic devices using audio plugs (male audio connectors) and mating audio jacks (female audio connectors). Audio connectors such as these may be provided in a variety of form factors. Most commonly, audio connectors take the form of 3.5 mm (⅛") miniature plugs and jacks. Other sizes are also sometimes used such as 2.5 mm subminiature connectors and ¼ inch connectors. In the context of accessories such as headsets, these audio connectors and their associated cables are generally used to carry analog signals such as audio signals for speakers and microphone signals. Digital connectors such as universal serial bus (USB) and Firewire® (IEEE 1394) connectors may also be used by electronic devices to connect to external equipment such as headsets, but it is generally preferred to connect headsets to electronic devices using standard audio connectors such as the 3.5 mm audio connector. Digital connectors such as USB connectors and IEEE 1394 connectors are primarily of use where large volumes of digital data need to be transferred with external equipment such as when connecting to a peripheral device such as a printer. Optical connectors, which may be integrated with digital and analog connectors, may be used to convey data between an electronic device and an associated accessory, particularly in environments that carry high bandwidth traffic such as video traffic. If desired, audio connectors may include optical communications structures to support this type of traffic.

The audio connectors that may be used in connecting an electrical device to external equipment may have a number of contacts. Stereo audio connectors typically have three contacts. The outermost end of an audio plug is typically referred to as the tip. The innermost portion of the plug is typically referred to as the sleeve. A ring contact lies between the tip and the sleeve. When using this terminology, stereo audio connectors such as these are sometimes referred to as tip-ring-sleeve (TRS) connectors. The sleeve can serve as ground. The tip contact can be used in conjunction with the sleeve to handle a left audio channel and the ring contact can be used in conjunction with the sleeve to handle the right channel of audio (as an example). In four-contact audio connectors an additional ring contact is provided to form a connector of the type that is sometimes referred to as a tip-ring-ring-sleeve (TRRS) connector. Four-contact audio connectors may be used to handle a microphone signal, left and right audio channels, and ground (as an example).

Electrical devices and external equipment may be connected in various ways. For example, a user may connect either a pair of stereo headphones or a headset that contains stereo headphones and a microphone to a cellular telephone audio jack. Electrical devices and external equipment may also be operated in various modes. For example, a cellular telephone may be used in a music player mode to play back stereo audio to a user. When operated in telephone mode, the same cellular telephone may be used to play telephone call left and right audio signals to the user while simultaneously processing telephone call microphone signals from the user.

Electronic devices and external equipment may be provided with path configuration circuitry that allows the electronic devices and external equipment to be operated in a variety of different operating modes in a variety of different combinations. When, for example, a user connects one type of accessory to an electronic device, the path configuration circuitry may be adjusted to form several unidirectional paths between the electronic device and the accessory. When, the user connects a different type of accessory to the electronic device, the path configuration circuitry may be adjusted to form one or more bidirectional paths in place of one or more of the unidirectional paths. The path configuration circuitry may also be used to configure the wired path between an electronic device and attached external equipment to convey power signals or digital data in place of analog signals such as audio. Combinations of these arrangements may also be used.

An illustrative system in which an electronic device and external equipment with path configuration circuitry may communicate over a wired path is shown in FIG. 1. As shown in FIG. 1, system 10 may include an electronic device such as electronic device 12 and external equipment 14. External equipment 14 may be equipment such as an automobile with a sound system, consumer electronic equipment such as a television or audio receiver with audio capabilities, a peer device (e.g., another electronic device such as device 12), or any other suitable electronic equipment. In a typical scenario, which is sometimes described herein as an example, external equipment 14 may be an accessory such as a headset. External equipment 14 is therefore sometimes referred to as "accessory 14." This is, however, merely illustrative. Accessory 14 may be any suitable electronic equipment if desired.

A path such as path 16 may be used to connect electronic device 12 and accessory 14. In a typical arrangement, path 16 includes one or more audio connectors such as 3.5 mm plugs and jacks or audio connectors of other suitable sizes. Conductive lines in path 16 may be used to convey signals over path 16. There may, in general, be any suitable number of lines in path 16. For example, there may be two, three, four, five, or more than five separate lines. These lines may be part of one or more cables. Cables may include solid wire, stranded wire, shielding, single ground structures, multi-ground structures, twisted pair structures, or any other suitable cabling structures. Extension cord and adapter arrangements may be used as part of path 16 if desired. In an adapter arrangement, some of the features of accessory 14 such as user interface and communications functions may be provided in the form of an adapter accessory with which an auxiliary accessory such as a headset may be connected to device 12.

Accessory 14 may be any suitable equipment or device that works in conjunction with electronic device 12. Examples of accessories include audio devices such as audio devices that contain or work with one or more speakers. Speakers in accessory 14 may be provided as earbuds or as part of a headset or may be provided as a set of stand-alone powered or unpowered speakers (e.g., desktop speakers). Accessory 14 may, if desired, include audio-visual (AV) equipment such as a receiver, amplifier, television or other display, etc. Devices such as these may use path 16 to receive audio signals from device 12. The audio signals may, for example, be provided in the form of analog audio signals that need only be amplified or passed to speakers to be heard by the user of device 12. An optional microphone in accessory 14 may pass analog microphone signals to device 12. Buttons or other user interface devices may be used to gather user input for device 12. The use of these and other suitable accessories in system 10 is merely illustrative. In general, any suitable external equipment may be used in system 10 if desired.

Electronic device 12 may be a desktop or portable computer, a portable electronic device such as a handheld electronic device that has wireless capabilities, equipment such as a television or audio receiver, or any other suitable electronic equipment. Electronic device 12 may be provided in the form of stand-alone equipment (e.g., a handheld device that is carried in the pocket of a user) or may be provided as an embedded system. Examples of systems in which device 12 may be embedded include automobiles, boats, airplanes, homes, security systems, media distribution systems for commercial and home applications, display equipment (e.g., computer monitors and televisions), etc.

Device 12 may communicate with network equipment such as equipment 18 over path 22. Path 22 may be, for example, a cellular telephone wireless path. Equipment 18 may be, for example, a cellular telephone network. Device 12 and network equipment 18 may communicate over path 22 when it is desired to connect device 12 to a cellular telephone network (e.g., to handle voice telephone calls to transfer data over cellular telephone links, etc.).

Device 12 may also communicate with equipment such as computing equipment 20 over path 24. Path 24 may be a wired or wireless path. Computing equipment 20 may be a computer, a set-top box, audio-visual equipment such as a receiver, a disc player or other media player, a game console, a network extender box, or any other suitable equipment.

In a typical scenario, device 12 may be, as an example, a handheld device that has media player and cellular telephone capabilities. Accessory 14 may be a headset with a microphone and a user input interface such as a button-based interface for gathering user input. Path 16 may be a four or five conductor audio cable that is connected to devices 12 and 14 using 3.5 mm audio jacks and plugs (as an example). Computing equipment 20 may be a computer with which device 12 communicates (e.g., to synchronize a list of contacts, media files, etc.).

While paths such as path 24 may be based on commonly available digital connectors such as USB or IEEE 1394 connectors, it may be advantageous to use standard audio connectors such as a 3.5 mm audio connector to connect device 12 to accessory 14. Connectors such as these are in wide use for handling audio signals. As a result, many users have a collection of headsets and other accessories that use 3.5 mm audio connectors. The use of audio connectors such as these may therefore be helpful to users who would like to connect their existing audio equipment to device 12. Consider, as an example, a user of a media player device. Media players are well known devices for playing media files such as audio files and video files that contain an audio track. Many owners of media players own one or more headsets that have audio plugs that are compatible with standard audio jacks. It would therefore be helpful to users such as these to provide device 12 with such a compatible audio jack, notwithstanding the potential availability of additional ports such as USB and IEEE 1394 high speed digital data ports for communicating with external devices such as computing equipment 20.

Although it is desirable to use audio connectors in certain situations, the connector assignments of conventional systems are typically fixed. For example, a conventional stereo system may have an audio jack that is used to provide stereo audio to connected headphones. There is no ability in this type of arrangement to selectively reconfigure the circuitry that is connected to the audio jack to provide additional or different functionality.

In system 10, electronic device 12 and accessory 14 may include adjustable path configuration circuitry. The path configuration circuitry may be adjusted to support different modes of operation. These different modes of operation may result from different combinations of accessories and electronic devices, scenarios in which different device applications are active, etc. With one suitable configuration, the path configuration circuitry may include hybrid circuits that can be selectively switched into use. When the hybrid circuits are not actively used, the communications line to which they are connected may be used for unidirectional audio communications. When the hybrid circuits are switched into active use, the same communications line may be used to support bidirectional audio signals (e.g., an outgoing left or right audio channel in one direction and an incoming microphone signal in the opposite direction). Because unidirectional paths may be selectively converted into bidirectional paths, it is possible to accommodate additional signals over the wired path between electronic device 12 and accessory 14. These additional signals may include power signals (e.g., a power supply voltage that the external equipment provides to electronic device 12 to charge a battery in device 12 or a power supply voltage that device 12 supplies to external equipment 14 to power circuitry such as noise cancellation circuitry), data signals (e.g., analog or digital audio signals or signals for display or control functions), user input signals (e.g., signals from button presses or other user input activity), sensor signals, or other suitable signals.

Figure 2:
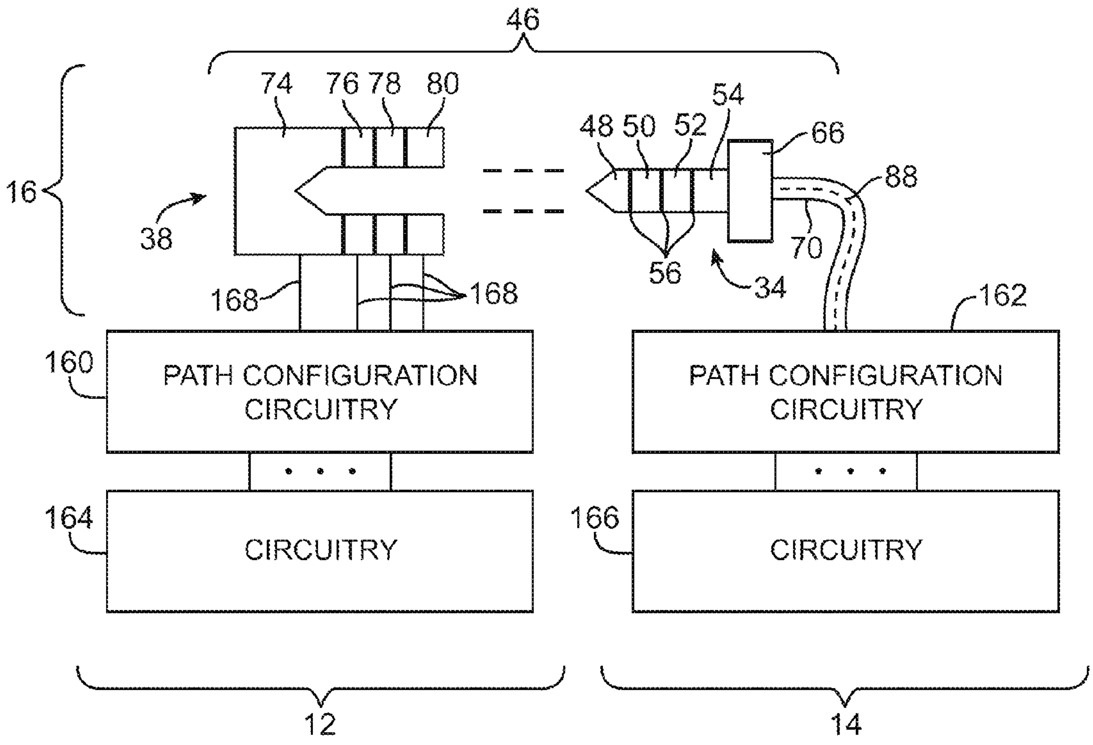
FIG. 2 is a diagram showing how path configuration circuitry may be used in an electronic device and external equipment such as a headset or other accessory to selectively configure how the device and external equipment interact over a communications path that includes an audio connector in accordance with an embodiment of the present invention.

As shown in FIG. 2, path configuration circuitry 160 may be provided in electronic device 12 and path configuration circuitry 162 may be provided in accessory 14 or other external equipment. Wired path 16 may be used to connect electronic device 12 and accessory 14. Path 16 may include audio connectors such as audio connectors 46.

As shown in FIG. 2, audio connectors 46 may include an audio plug such as plug 34 (i.e., a male audio connector). Plug 34 may mate with a corresponding audio jack such as audio jack 38 (i.e., a female audio connector). Connectors 46 may be used at any suitable location or locations within path 16. For example, audio jacks such as jack 38 can be formed within the housing of device 12 and plugs such as plug 34 can be formed on the end of a cable that is associated with a headset or other accessory 14. As shown in FIG. 2, cable 70 may be connected to audio plug 34 via strain-relief plug structure 66. Structures such as structure 66 may be formed with an external insulator such as plastic (as an example).

Audio plug 34 is an example of a four-contact plug. A four-contact plug has four conductive regions that mate with four corresponding conductive regions in a four-contact jack such as jack 38. As shown in FIG. 2, these regions may include a tip region such as region 48, ring regions such as rings 50 and 52, and a sleeve region such as region 54. These regions surround the cylindrical surface of plug 34 and are separated by insulating regions 56. When plug 34 is inserted in mating jack 38, tip region 48 may make electrical contact with jack tip contact 74, rings 50 and 52 may mate with respective ring regions 76 and 78, and sleeve 54 may make contact with sleeve terminal 80. In a typical configuration, there are four wires in cable 70, each of which is electrically connected to a respective contact.

The signal assignments that are used in audio connectors 46 depend on the type of electronic device and accessory being used. In one typical configuration, ring 52 may serve as ground. Tip 48 and ring 52 may be used together to handle a left audio channel (e.g., signals for a left-hand speaker in a headset). Ring 50 and ring 52 may be used for right channel audio. In accessories that contain microphones, ring 52 and sleeve 54 may be used to carry microphone audio signals from the accessory to electronic device 12. These signal assignments may be altered to accommodate other types of electronic device and accessories and to accommodate different modes of operation. Signal assignment adjustments may be made by adjusting path configuration circuitry such as path configuration circuitry 160 and 162. This circuitry may be adjusted using control circuitry in electronic device 12 and accessory 14. As shown in the schematic diagram of FIG. 2, the circuitry of electronic device 12 may include internal components 164 that are connected to path configuration circuitry 160 and the circuitry of accessory 14 may include internal components 166 that are connected to path configuration circuitry 162.

Paths such as conductive lines 168 may be used to connect each of the audio connector terminals to path configuration circuitry 160. In audio connector arrangements in which one of lines 168 and an associated line in path 16 are used to convey microphone signals, the line 168 and the associated line in path 16 that carries the microphone signals may sometimes be referred to as the microphone line. The corresponding contacts in audio connectors 46 are sometimes referred to as microphone contacts or terminals.

The audio connectors and path configuration circuitry form audio ports on device 12 and accessory 14. For example, conductive lines 88 in cable 70, the associated metal contacts on audio connector 34, and the path configuration circuitry and associated circuitry 166 of accessory 14 form a first audio connector port, whereas the conductive contacts, lines 168, path configuration circuitry 160 and associated circuitry 164 of device 12 form a second audio connector port.

These audio connector ports can be selectively configured using the path configuration circuitry. For example, the microphone path of path 16 and each audio connector port may be selectively configurable between a unidirectional path state in which analog microphone signals are conveyed over the microphone path (without any counter-propagating analog audio signals) and a bidirectional path state in which analog signals are conveyed bidirectionally. In the bidirectional path state of each audio connector port and microphone line, analog microphone signals may be conveyed in one direction over the microphone line while analog audio signals such as played back audio file signals are simultaneously counter-propagated in the opposite direction over the microphone line.

Figure 3:
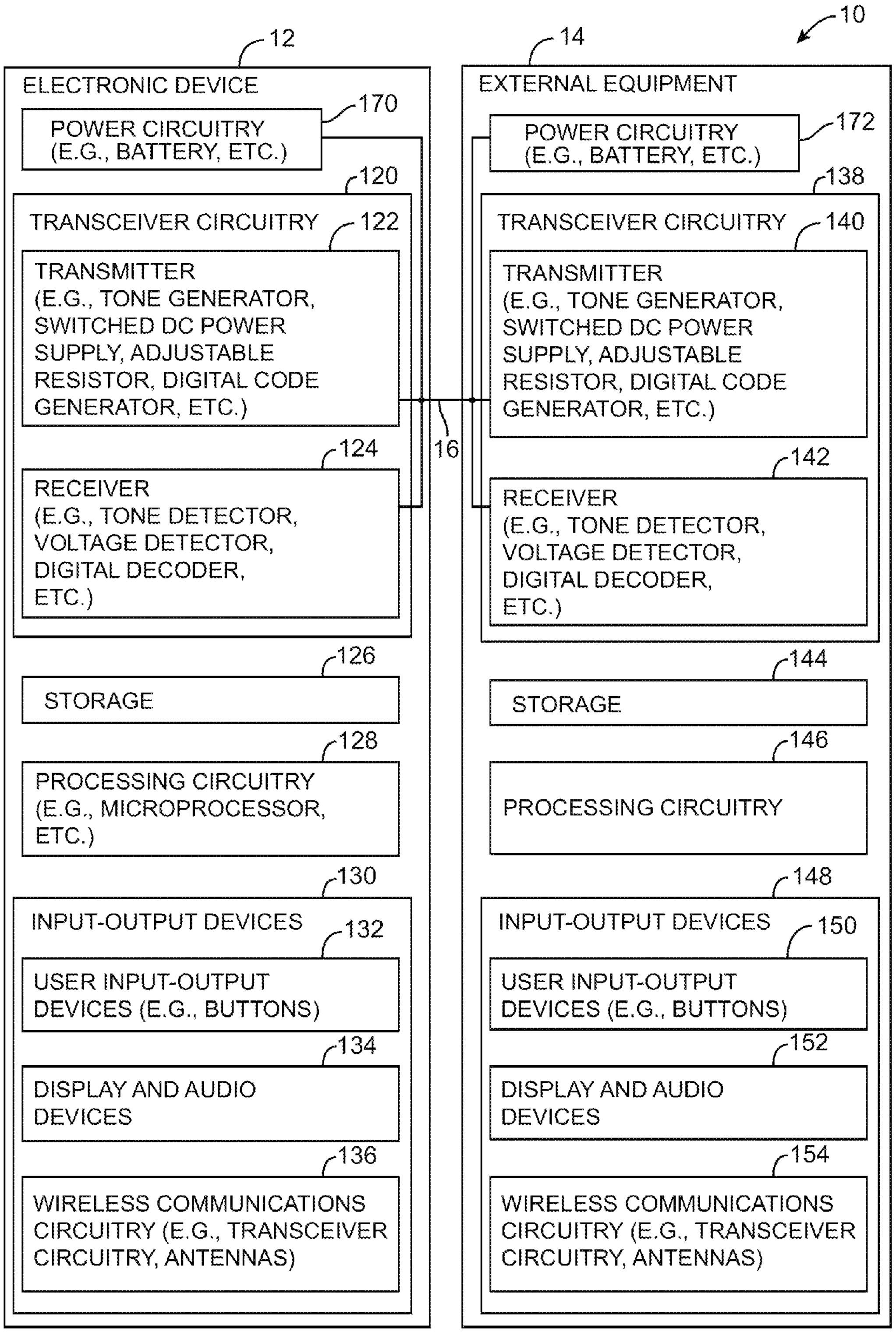
FIG. 3 is a schematic diagram showing illustrative circuitry that may be used in an electronic device and an associated accessory or other external equipment in accordance with an embodiment of the present invention.

A generalized diagram of an illustrative electronic device 12 and accessory 14 is shown in FIG. 3. In the FIG. 3 example, device 12 and accessory 14 are shown as possibly including numerous components for supporting communications and processing functions. If desired, some of these components may be omitted, thereby reducing device cost and complexity. The inclusion of these components in the schematic diagram of FIG. 3 is merely illustrative.

Device 12 may be, for example, a computer or handheld electronic device that supports cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc. Accessory 14 may be, for example, a headset with or without a microphone, a set of stand-alone speakers, audio-visual equipment, an adapter (e.g., an adapter such as adapter 112 of FIG. 6), an external controller (e.g., a keypad), a sound system such as an automobile stereo system, or any other suitable external equipment that may be connected to device 12. Path 16 may include audio connectors such as connectors 46 of FIG. 2 or other suitable connectors.

As shown in FIG. 3, device 12 may include power circuitry 170 and accessory 14 may include power circuitry 172. Power circuitry 170 and 172 may include batteries such as rechargeable batteries, power adapter circuitry such as alternating current to direct current converter circuitry, battery charging circuitry, etc.

If desired, power circuitry 172 may supply power to device 12 over path 16 (e.g., to recharge a battery in device 12). Power circuitry 172 may, for example, be provided as part of the stereo system and other electronic equipment in an automobile. An audio cable may be used to connect device 12 to the automobile stereo system (e.g., using the audio cable to form path 16). When a user plugs device 12 into the automobile's electronics in this way, power circuitry 172 in the automobile may be used to deliver direct current (DC) power to power circuitry 170 in device 12 (e.g., to recharge a battery in device 12 through one of the conductive lines in path 16).

In other arrangements, power may be delivered from device 12 to accessory 14 over one of the lines in path 16. For example, a handheld electronic device battery in circuitry 170 of device 12 may supply power to circuitry 172 and to amplifier circuitry and other circuitry in an accessory 14 such as a headset.

By using path configuration circuitry 160 and 162 of FIG. 2, one or more of the lines in path 16 can be converted to power delivery lines in some situations (e.g., during certain modes of operation and when certain types of components are used) and may be converted to analog audio lines, digital data lines, or other types of lines in other situations.

Device 12 and accessory 14 may include storage 126 and 144. Storage 126 and 144 may include one or more different types of storage such as hard disk drive storage, nonvolatile memory (e.g., flash memory or other electrically-programmable-read-only memory), volatile memory (e.g., static or dynamic random-access-memory), etc.

Processing circuitry 128 and 146 may be used to control the operation of device 12 and accessory 14. Processing circuitry 128 and 146 may be based on processors such as microprocessors and other suitable integrated circuits. These circuits may include application-specific integrated circuits, audio codecs, video codecs, amplifiers, communications interfaces, power management units, power supply circuits, circuits that control the operation of wireless circuitry, radio-frequency amplifiers, digital signal processors, analog-to-digital converters, digital-to-analog converters, or any other suitable circuitry.

With one suitable arrangement, processing circuitry 128 and 146 and storage 126 and 144 are used to run software on device 12 and accessory 14. The complexity of the applications that are implemented depends on the needs of the designer of system 10. For example, the software may support complex functionality such as internet browsing applications, voice-over-internet-protocol (VOIP) telephone call applications, email applications, media playback applications, operating system functions, and less complex functionality such as the functionality involved in encoding button presses as ultrasonic tones. To support communications over path 16 and to support communications with external equipment such as equipment 18 and 20 of FIG. 1, processing circuitry 128 and 146 and storage 126 and 144 may be used in implementing suitable communications protocols. Communications protocols that may be implemented using processing circuitry 128 and 146 and storage 126 and 144 include internet protocols, wireless local area network protocols (e.g., IEEE 802.11 protocols—sometimes referred to as Wi-Fi®), protocols for other short-range wireless communications links such as the Bluetooth® protocol, protocols for handling 3G communications services (e.g., using wide band code division multiple access techniques), 2G cellular telephone communications protocols, serial and parallel bus protocols, etc. In a typical arrangement, more complex functions such as wireless functions are implemented exclusively or primarily on device 12 rather than accessory 14, but accessory 14 may also be provided with some or all of these capabilities if desired.

Input-output devices 130 and 148 may be used to allow data to be supplied to device 12 and accessory 14 and may be used to allow data to be provided from device 12 and accessory 14 to external destinations. Input-output devices 130 and 148 can include devices such as non-touch displays and touch displays (e.g., based on capacitive touch or resistive touch technologies as examples). Visual information may also be displayed using light-emitting diodes and other lights. Input-output devices 130 and 148 may include one or more buttons. Buttons and button-like devices may include keys, keypads, momentary switches, sliding actuators, rocker switches, click wheels, scrolling controllers, knobs, joysticks, D-pads (direction pads), touch pads, touch sliders, touch buttons, and other suitable user-actuated control interfaces. Input-output devices 130 and 148 may also include microphones, speakers, digital and analog input-output port connectors and associated circuits, cameras, etc. Wireless circuitry in input-output devices 130 and 148 may be used to receive and/or transmit wireless signals.

As shown schematically in FIG. 3, input-output devices 130 may sometimes be categorized as including user input-output devices 132 and 150, display and audio devices 134 and 152, and wireless communications circuitry 136 and 154. A user may, for example, enter user input by supplying commands through user input devices 132 and 150. Display and audio devices 134 and 152 may be used to present visual and sound output to the user. These categories need not be mutually exclusive. For example, a user may supply input using a touch screen that is being used to supply visual output data.

As indicated in FIG. 3, wireless communications circuitry 136 and 154 may include antennas and associated radio-frequency transceiver circuitry. For example, wireless communications circuitry 136 and 154 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

The antenna structures and wireless communications devices of devices 12 and accessory 14 may support communications over any suitable wireless communications bands. For example, wireless communications circuitry 136 and 154 may be used to cover communications frequency bands such as cellular telephone voice and data bands at 850 MHz, 900 MHz, 1800 MHz, 1900 MHz, and 2100 MHz (as examples). Wireless communications circuitry 136 and 154 may also be used to handle the Wi-Fi® (IEEE 802.11) bands at 2.4 GHz and 5.0 GHz (also sometimes referred to as wireless local area network or WLAN bands), the Bluetooth® band at 2.4 GHz, and the global positioning system (GPS) band at 1575 MHz.

Although both device 12 and accessory 14 are depicted as containing wireless communications circuitry in the FIG. 3 example, there are situations in which it may be desirable to omit such capabilities from device 12 and/or accessory 14. For example, it may be desired to power accessory 14 solely with a low-capacity battery or solely with power received through path 16 from device 12. In situations such as these, the use of extensive wireless communications circuitry may result in undesirably large amounts of power consumption. For low-power applications and situations in which low cost and weight are of primary concern, it may therefore be desirable to limit accessory 14 to low-power-consumption wireless circuitry (e.g., infrared communications) or to omit wireless circuitry from accessory 14. Moreover, not all devices 12 may require the use of extensive wireless communications capabilities. A hybrid cellular telephone and media player device may benefit from wireless capabilities, but a highly portable media player may not require wireless capabilities and such capabilities may be omitted to conserve cost and weight if desired.

Transceiver circuitry 120 and 138 may be used to support communications between electronic device 12 and accessory 14 over path 16. In general, both device 12 and accessory 14 may include transmitters and receivers. For example, device 12 may include a transmitter that produces signal information that is received by receiver 142 in accessory 14. Similarly, accessory 14 may have a transmitter 140 that produces data that is received by receiver 124 in device 12. If desired, transmitters 122 and 140 may include similar circuitry. For example, both transmitter 122 and transmitter 140 may include ultrasonic tone generation circuitry (as an example). Receivers 124 and 142 may each have corresponding tone detection circuitry. Transmitters 122 and 140 may also each have DC power supply circuitry for creating various bias voltages (which may be constant or which may be varied occasionally to convey information or to serve as a control signals), digital communications circuitry for transmitting digital data, analog signal transmission circuitry, or other suitable transmitter circuitry, whereas receivers 124 and 142 may have corresponding receiver circuitry such as voltage detector circuitry, analog components or receiver circuitry, digital receivers, etc. Symmetric configurations such as these may allow comparable amounts of information to be passed in both directions over link 16, which may be useful when accessory 14 needs to present extensive information to the user through input-output devices 148 or when extensive handshaking operations are desired (e.g., to support advanced security functionality).

It is not, however, generally necessary for both device 12 and accessory 14 to have identical transmitter and receiver circuitry. Device 12 may, for example, be larger than accessory 14 and may have available on-board power in the form of a rechargeable battery, whereas accessory 14 may be unpowered (and receiving power only from device 12) or may have only a small battery (for use alone or in combination with power received from device 12). As another example, accessory 14 may be part of a relatively complex system, whereas device 12 may be formed in a small housing that limits the amount of circuitry that may be used in device 12. In situations such as these, it may be desirable to provide device 12 and accessory 14 with different communications circuitry.

As an example, transmitter 122 in device 12 may include adjustable DC power supply circuitry. By placing different DC voltages on the lines of path 16 at different times, device 12 can communicate relatively modest amounts of data to accessory 14. This data may include, for example, data that instructs accessory 14 to power its microphone (if available) or that instructs accessory 14 to respond with an acknowledgement signal. A voltage detector and associated circuitry in receiver 138 of accessory 14 may process the DC bias voltages that are received from device 12. In this type of scenario, transmitter 140 in accessory 14 may include an ultrasonic tone generator that supplies acknowledgement signals and user input data (e.g., button press data) to device 12. A tone detector in receiver 124 may decode the tone signals for device 12. These are merely illustrative examples. Device 12 and accessory 14 may include any suitable transceiver circuitry, if desired.

Applications running on the processing circuitry of device 12 may use decoded user input data as control signals. As an example, a cellular telephone application may interpret user input as commands to answer or hang up a cellular telephone call, a media playback application may interpret user input as commands to skip a track, to pause, play, fast-forward, or rewind a media file, etc. Still other applications may interpret user button-press data or other user input as commands for making menu selections, etc.

Figure 4:
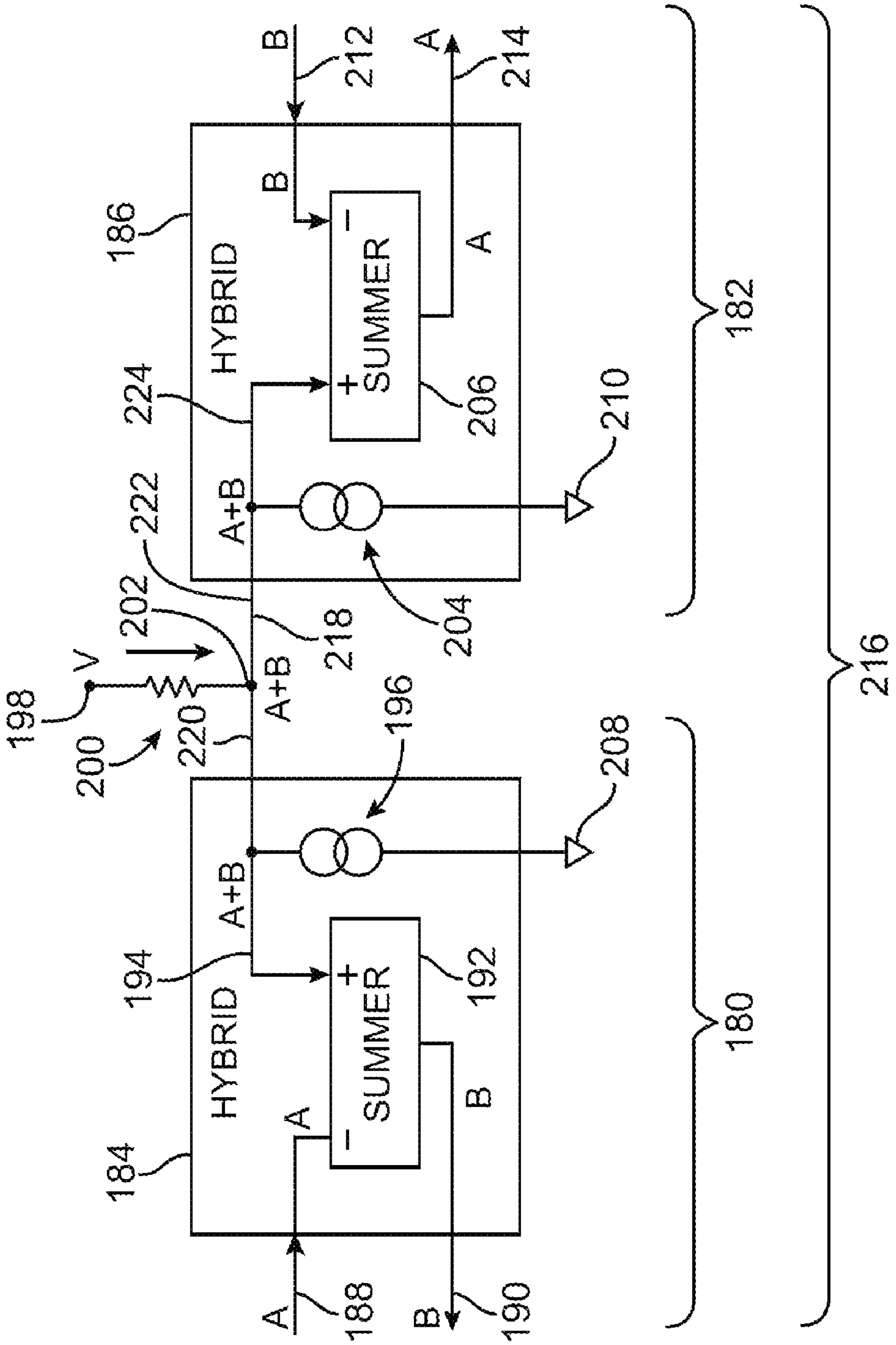
FIG. 4 is a circuit diagram showing how hybrid circuits may be used in a communications path between an electronic device and external equipment in accordance with an embodiment of the present invention.

One illustrative circuit that may be used for one or more of the lines in path 16 is the hybrid circuitry of FIG. 4. Circuitry 216 of FIG. 4 may include circuitry such as circuitry 180 that is located in device 12 and circuitry such as circuitry 182 that is located in accessory 14. Line 218 may be one of the lines in path 16. Node 198 may be provided with a voltage V from a voltage source. Node 198 and resistor 200 may be located in device 12 (e.g., as part of female audio connector port circuitry in device 12) or in accessory 14 (e.g., as part of male audio connector port circuitry in accessory 14). For example, node 198 and resistor 200 may be located in device 12 and may be powered by a microphone bias voltage source in device 12 (as an example).

When configured as shown in FIG. 4, the circuitry of FIG. 4 may support bidirectional communications. The signals that are conveyed over path 218 in FIG. 4 may, for example, be analog signals such as microphone signals or left or right channel audio signals. Signals such as these typically lie in a frequency range of about 20 Hz to 20 kHz. If desired, ultrasonic signals (e.g., tones above 20 kHz in frequency such as 75 kHz to 300 kHz tones) may be conveyed over path 218. Still other signals such as digital pulses may be conveyed if desired.

Circuitry 216 may include hybrid circuits 184 and 186 (sometimes referred to as “hybrids”). Hybrid 184 has input port 188 and output port 190. Common port 220 serves as both an input and an output for hybrid 184. Current source 196 is connected between line 194 and ground 208 and is modulated by the input signal on input 188. Hybrid 186 has input port 212 and output port 214. Common port 222 serves as both an input and an output for hybrid 186. Modulated current source 204 is connected between line 224 and ground 210 and is controlled by the magnitude of the input signal on input 212.

In the example of FIG. 4, hybrid 184 receives an input voltage signal A on input 188 and hybrid 186 receives an input voltage signal B on input 212. In response, a current proportional to A flows through current source 196 and a current proportional to B flows through current source 204. A resulting sum current that is proportional to A+B flows from positive voltage node 198 to node 202 via resistor 200 and produces a voltage that is proportional to the sum of voltages A and B (i.e., the voltage at node 202 is proportional to A+B as shown in FIG. 4).

Hybrid 184 has a summing circuit such as summer 192 with a negative input (−) and a positive input (+). The negative input of summer 192 receives the signal A from input 188 while the positive input receives the common signal A+B from common input 220. The resulting output of summer 192 is signal B and is provided to output 190. In hybrid 186, the negative input of summer 206 receives voltage A+B while the positive input of summer 206 receives voltage B. A corresponding output voltage A is produced by summer 206 and is routed to output 214, as shown in FIG. 4.

Hybrid circuitry 216 supports bidirectional (full duplex) communications. Device 12 may supply signal A to accessory 14 while accessory 14 simultaneously supplies signal B to device 12. The signals that are transmitted in this way may be, for example, analog audio signals (e.g., analog signals in the audible frequency range of 20 Hz to 20 kHz), ultrasonic tones (e.g., tones at frequencies above 20 kHz that may be used alone or in patterns to represent control data or other signals), digital data, etc. The bias voltage V that is supplied to node 198 may be conveyed over path 222 (e.g., to bias a microphone in accessory 14). In this way, circuitry 216 can simultaneously convey analog audio output (e.g., a left or right channel of audio playback for accessory 14), microphone input (e.g., microphone signals for device 12), and a bias voltage (e.g., to power microphone circuitry in accessory 14).

In situations in which the bidirectional nature of path 216 is desired, path configuration circuitry such as path configuration circuitry 160 and 162 may be adjusted to switch hybrids 184 and 186 into use and thereby selectively form the hybrid circuit path 216 of FIG. 4. In other situations, where only a unidirectional path is desired (e.g., to support microphone input without simultaneous audio output), the path configuration circuitry can be adjusted to switch hybrids 184 and 186 out of use.

Figure 5:
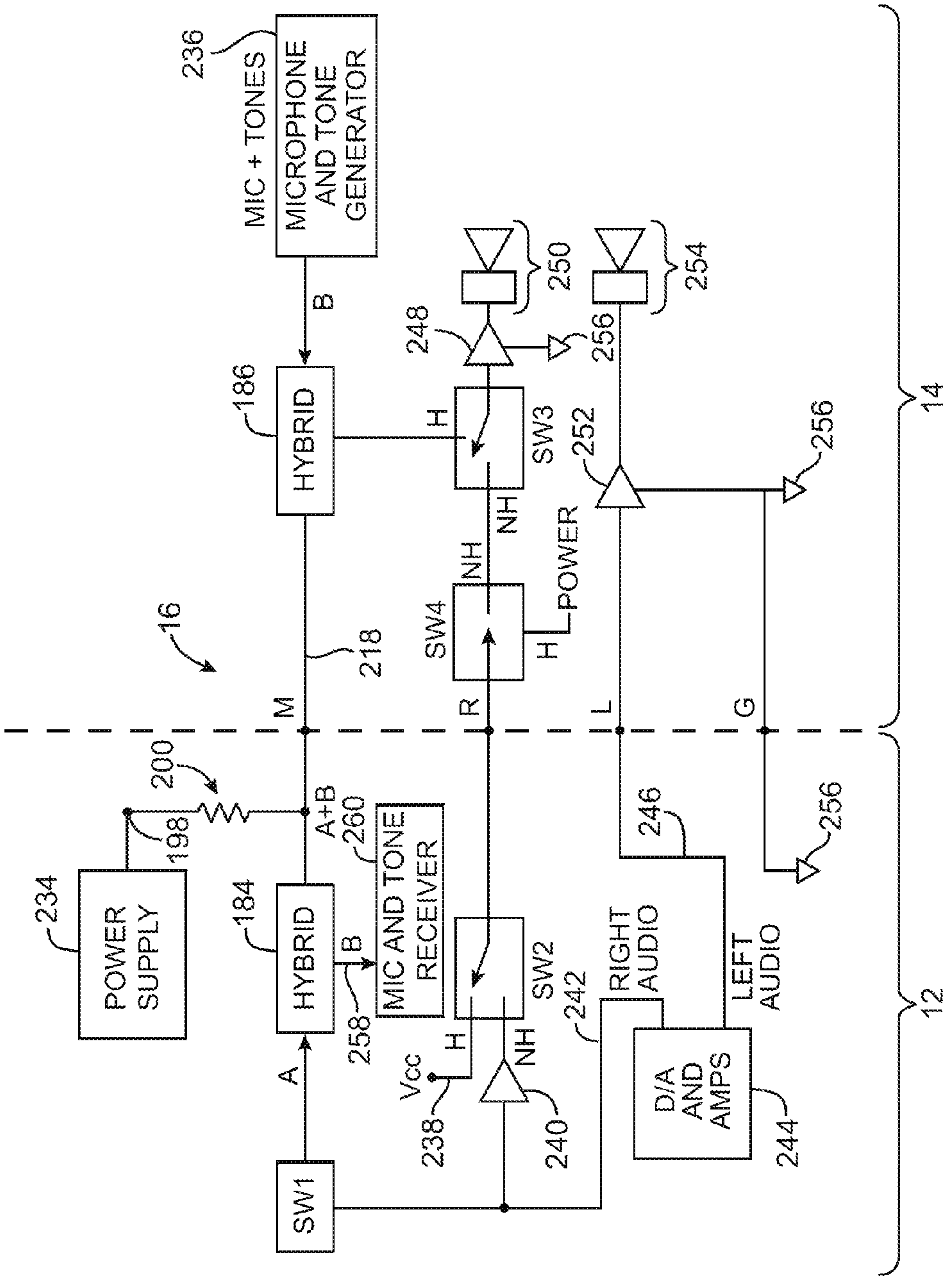
FIG. 5 is a circuit diagram of illustrative path configuration circuitry and associated components in an illustrative electronic device and external circuitry such as a headset accessory in accordance with an embodiment of the present invention.

FIG. 5 shows an illustrative circuit configuration in which hybrids 184 and 186 are used in path 16 and are selectively switched in and out of use by path configuration circuitry. Path 16 may contain audio connectors having a microphone line and terminal M, a ground line and terminal G, a right line and terminal R, and a left line and terminal L. Microphone line M may be placed in either a unidirectional or bidirectional configuration by switching the hybrids in or out of use. Ground terminal G may be connected to ground 256.

In the FIG. 5 arrangement, power supply circuitry 234 may supply a voltage such as a direct-current (DC) bias voltage to node 198 and microphone line M. Switch SW1 may be placed in a closed position when it is desired to switch hybrids 184 and 186 into use to convert the microphone line M into a bidirectional line.

In the bidirectional microphone line mode, microphone signals and optional ultrasonic tones may be conveyed from microphone and tone generator circuitry 236 to microphone receiver circuitry and tone receiver circuitry 260 in device 12 via path 258. The ultrasonic tone signals may correspond to user button actuation events or other information from accessory 14. The microphone signals may correspond to audio signals such as signals representing the user’s voice.

At the same time that microphone and tone signals are being routed from circuitry 236 to circuitry 260 via hybrid 186 and hybrid 184, audio signals from device 12 can be conveyed in the opposite direction over microphone line M. In particular, device 12 may have an audio playback circuit that includes a digital-to-analog converter circuit and associated amplifier circuitry 244. This circuitry may generate an analog audio output signal such as a right (or left) channel of a stereo audio playback signal. The right audio signal may be conveyed to speaker 250 in accessory 14 over path 242, through closed switch SW1, through hybrids 184 and 186, through switch SW3 (which is in position H), and through amplifier 248.

The left audio line L may be used to convey left channel audio from digital-to-analog converter and amplifier circuitry 244 to speaker 254 via path 246 and amplifier 252. Amplifiers 248 and 252 may have associated automatic noise reduction circuits and noise reduction microphones (e.g., microphones located near speakers 250 and 254 that feed back local acoustic signals that are canceled out from the right and left channel audio by the automatic noise reduction circuits). This audio circuitry and other circuitry in accessory 14 may need a source of relatively low-impedance power to operate. Although the microphone bias voltage on node 198 may be sufficient to power a voice microphone in circuitry 236, more power may be needed to support additional functions. This power may be supplied over the signal line R in path 16 when the microphone line M is being operated in bidirectional mode, because the R line is not needed for right channel audio.

Accordingly, in bidirectional microphone line mode, switch SW2, switch SW3, and switch SW4 may be placed in their H positions. This routes low-impedance power supply voltage Vcc from line 238 in device 12 to power terminal POWER in accessory 14 over line R. Line 238 may be connected to the output of a direct-current voltage source such as power supply 234.

When low-impedance (high power) voltage is not needed, microphone line M may be converted to unidirectional mode. In this mode, switch SW1 is opened and switches SW2, SW3, and SW4 are placed in their NH positions. Right channel audio from digital-to-analog converter and amplifier circuitry 244 is routed along path 242, through amplifier 240, through switches SW2, SW4, and SW3, through amplifier 248 (or an associated bypass path) to speaker 250. Microphone line M may be used to convey microphone signals and optional ultrasonic tones from accessory 14 to device 12.

Figure 6:
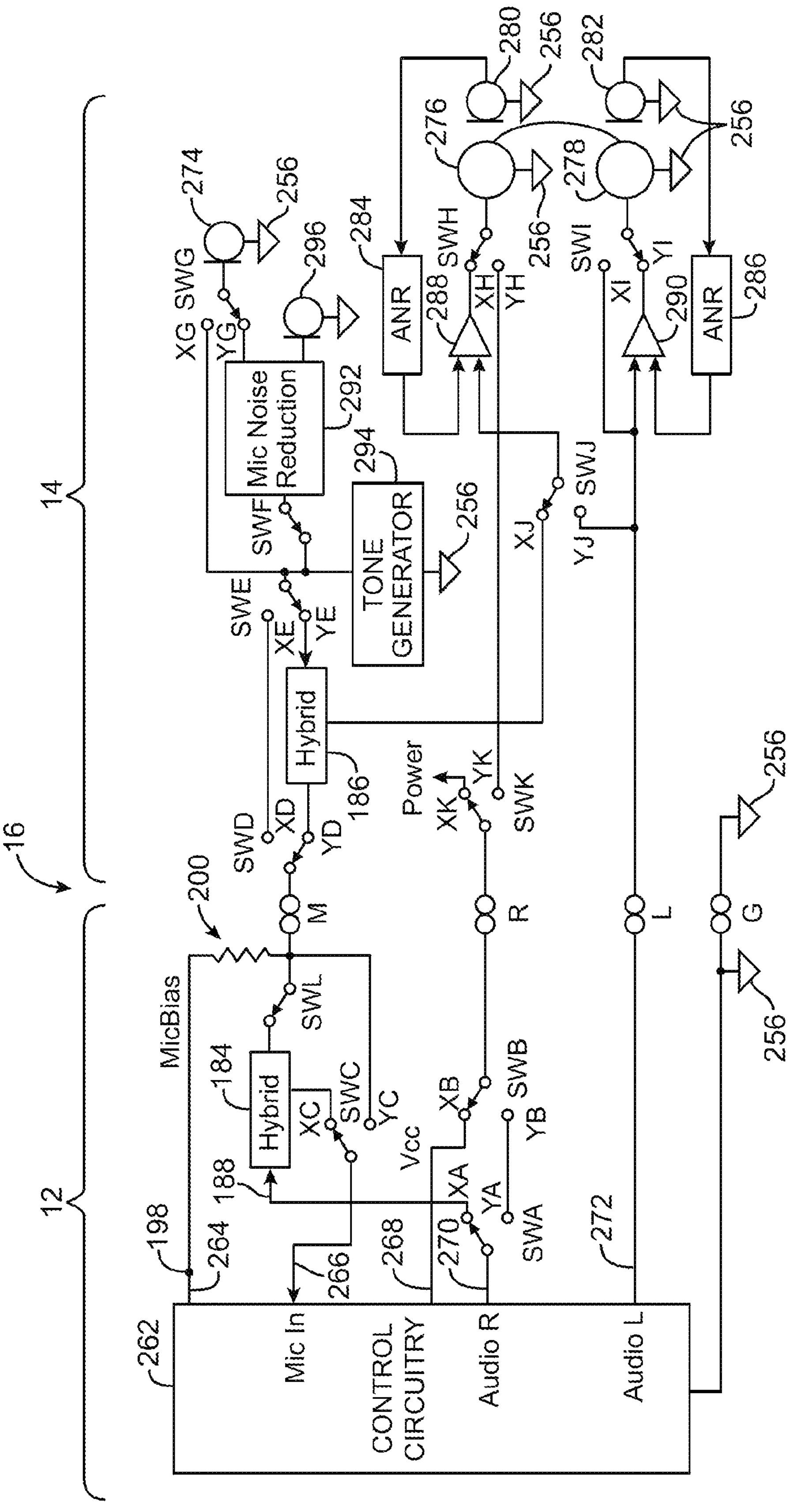
FIG. 6 is a circuit diagram of further illustrative path configuration circuitry and associated components in an illustrative electronic device and external circuitry such as a headset accessory in accordance with an embodiment of the present invention.

Another illustrative arrangement that may be used to selectively configure the lines in path 16 between electronic device 12 and accessory 14 is shown in FIG. 6. As shown in FIG. 6, electronic device 12 may have control circuitry 262. Control circuitry 262 may contain power supply circuits, transmitter and receiver circuitry, digital-to-analog converter and audio amplifier circuitry, and other circuits. Line 264 may be connected to a power supply in control circuitry 262 and may be used to supply a DC microphone bias voltage to node 198. When microphone 274 in accessory 14 is used, the microphone bias voltage on node 198 may power the microphone. Line 266 may be coupled to microphone signal amplifier circuitry in control circuitry 262 and other signal receiver circuitry (e.g., an ultrasonic tone detector).

Line 268 may be coupled to a source of DC power (e.g., a low-impedance, relatively high-power voltage source at a voltage Vcc). Lines 270 and 272 may be respectively coupled to left and right audio output channels in control circuitry 262.

Accessory 14 of FIG. 6 may be a headset or other equipment that includes microphone 274 and headset speakers 276 and 278. Microphone 274 may be used to pick up the user's voice or other sounds. Microphones 280 and 282 and ambient noise reduction circuits 284 and 286 may be used to implement noise cancellation functionality. When switched into use, ambient noise is picked up by microphones 280 and 282 and a corresponding cancelling signal is produced at the outputs of circuits 284 and 286. When this noise cancelling signal is fed back to speakers 276 and 278 via differential amplifiers 288 and 290, respectively, the level of ambient noise that is presented to the user is reduced. The noise reduction circuits can be switched into use by placing switches SWH and SWI in positions XH and YI, respectively. Noise reduction can be bypassed by using switch positions YH and XI for switches SWH and SWI. When the noise reduction circuits are switched into use, path 268 may supply low-impedance power for amplifiers 288 and 290 and ambient noise reduction circuits 284 and 286. Path 268 may also supply power for additional circuits such as microphone noise reduction circuit 292 and its associated noise reduction microphone 296, for ultrasonic tone generator 294, and for other circuits (e.g., to bias microphone 274, to power audio equalization circuitry, etc.).

Electronic device 12 and accessory 14 of FIG. 6 may be operated in a variety of modes. Mode adjustments may be made by adjusting switches (part of path configuration circuitry 160 and 162 of FIG. 2) using control signals. Control signals for adjusting the switches and other circuitry of FIG. 6 may be provided by control circuitry in device 12 and accessory 14.

Consider, as an example, a situation in which it is desired to provide ambient noise reduction, voice microphone noise reduction, and stereo audio. In this situation, the path configuration circuitry may be adjusted to convert microphone line M into a bidirectional path.

In particular, as shown in FIG. 6, switch SWA may be placed in position XA to route right channel audio to input 188 of hybrid 184. Switch SWL may be closed to connect the common port of hybrid 184 to microphone terminal M. Switch SWD may be placed in position YD to connect the common port of hybrid 186 to microphone line M. Switch SWE may be placed in position YE and switch SWF may be closed to connect the input of hybrid 186 to tone generator 294 and microphone noise reduction circuit 292. Switch SWG may be placed in position YG to route microphone signals from voice microphone 274 to a first of the two inputs to microphone noise reduction circuit 292. The second of the two inputs to microphone noise reduction circuit 292 may receive ambient noise signals from microphone 296. Switch SWC may be placed in position XC to route the microphone signals and ultrasonic tone signals from the output of hybrid 184 to terminal 266.

Switch SWB may be placed in position XB to route low-impedance voltage Vcc from output 268 to accessory 14. In accessory 14, switch SWK may be placed in position XK to route power Vcc from line R to power terminal "POWER." This power may be distributed to circuitry in accessory 14 that requires low-impedance power such as noise reduction circuitry, equalization circuitry, etc. With power available, ambient noise reduction can be switched into use by placing switch SWH in position XH and switch SWI in position YI.

Outgoing left channel audio can be provided from output terminal 272 to speaker 278 and its ambient noise reduction circuitry via line L. Line R is being used to supply low-impedance power, but right channel audio may be bypassed around line R by routing output signals from output 270 to speaker 276 through the microphone line M and its associated hybrid circuitry. The ability to selectively configure the microphone line from a unidirectional analog audio signal path to a bidirectional analog audio signal path allows stereo audio playback capabilities and microphone capabilities to be preserved, even when one of the paths between device 12 and accessory 14 is being used to convey low-impedance power to accessory 14.

If desired, additional circuitry in accessory 14 may use the low-impedance power that is provided in this way. For example, accessory 14 may be provided with a display screen, status indicator lights, audio equalization circuitry, communications circuits, battery charging circuits, or other circuitry that benefits from low-impedance power availability. The arrangement of FIG. 6 in which the voltage Vcc is being used to power noise reduction circuitry is merely illustrative.

If desired, the circuitry of FIG. 6 can be operated in a mode in which headphone ambient noise reduction is switched on, microphone noise reduction is active, and audio playback is provided in a monaural fashion rather than stereo. In this configuration, hybrids 184 and 186 are not needed and can be switched out of use by opening switch SWL, by placing switch SWD in position XD, by placing switch SWE in position XE, and by placing switch SWC in position YC. With switch SWC in position YC, microphone signals from line M may be routed to microphone input line 266 without passing through hybrid 184. Switch SWF may be closed and switch SWG may be placed in position YG to enable microphone noise reduction. To enable headphone noise reduction, switch SWH may be placed in position XH and switch SWI may be placed in position YI. Power can be routed from line 268 to the POWER terminal in accessory 14 by placing switch SWB in position XB and switch SWK in position XK. Right audio channel output is not provided to line 270, so the position of switch SWA is immaterial. With this type of arrangement, one of the audio channel lines (i.e., line R) can be used for low-impedance power delivery, because both audio lines are not needed for delivering stereo audio. Switch SWJ may be placed in position YJ to route audio to speaker 276 in parallel with speaker 278.

Another possible operating configuration for the circuitry of FIG. 6 involves activating headphone ambient noise reduction while delivering low-impedance power and monaural audio. In this arrangement, it is also not necessary to configure microphone line M for bidirectional analog signaling. Hybrids 184 and 186 may therefore be switched out of use by opening switch SWL, by placing switch SWD in position XD, by placing switch SWE in position XE, and by placing switch SWC in position YC. Microphone signals from line M may be routed to microphone input line 266 through switch SWC. Switch SWF may be opened to disconnect microphone noise reduction circuit 292.

As with the other usage scenarios, a transmitter such as tone generator 294 can be used to transmit user input commands or other control signals or information from accessory 14 to device 12. A corresponding receiver in control circuitry 262 may receive and process the transmitted signals.

Because microphone noise reduction is not being used in this scenario, switch SWG may be placed in position XG to bypass inactive microphone noise reduction circuit 292. To enable headphone noise reduction, switch SWH may be placed in position XH and switch SWI may be placed in position YI. Power can be routed from line 268 to the POWER terminal in accessory 14 by placing switch SWB in position XB and switch SWK in position XK. The position of switch SWA is immaterial, because in monaural playback mode no right channel audio is provided to line 270, only left channel audio is provided on output 272. Switch SWJ may be placed in position YJ to route monaural audio from output 272 to speaker 276 in parallel with speaker 278.

Another possible operating mode for the circuitry of FIG. 6 involves use of headset ambient noise reduction and stereo audio playback without microphone ambient noise reduction. In this type of configuration, hybrids 184 and 186 may be switched into use to allow microphone line M to handle bidirectional analog signals. Microphone signals may be conveyed from microphone 274 to device 12 over line M while audio signals for right channel audio are routed to accessory 14 over line M. Low impedance power can be routed to accessory 14 over right channel path R.

This type of arrangement may be implemented by placing switch SWA in position XA to route right channel audio to input 188 of hybrid 184. Switch SWL may be closed to connect the common port of hybrid 184 to microphone terminal M. Switch SWD may be placed in position YD to connect the common port of hybrid 186 to microphone line M. Switch SWE may be placed in position YE to connect the input of hybrid 186 to tone generator 294. Switch SWF may be opened to disable microphone noise reduction circuit 292. Switch SWG may be placed in position XG to bypass circuit 292 and to route microphone signals from voice microphone 274 to switch SWE and the microphone line M. Switch SWC may be placed in position XC to route incoming microphone signals and ultrasonic tone signals from accessory 14 to terminal 266. Switch SWB may be placed in position XB to route voltage Vcc from output 268 to accessory 14. In accessory 14, switch SWK may be placed in position XK to route power Vcc from line R to power terminal "POWER." The voltage on terminal "POWER" may be distributed to circuitry in accessory 14 that requires low-impedance power such as noise reduction circuitry, equalization circuitry, etc.

Headset ambient noise reduction can be switched into use by placing switch SWH in position XH and switch SWI in position YI. Left channel audio can be provided from output terminal 272 to speaker 278 and its ambient noise reduction circuitry via line L. Right channel audio may be bypassed around line R by routing output signals from output 270 to speaker 276 through the microphone line M and its associated hybrid circuitry.

Yet another possible operating mode for the circuitry of FIG. 6 involves use of microphone ambient noise reduction and monaural audio playback without headset ambient noise reduction. Because only monaural audio output is supported in this operating mode, microphone line M may be configured as a unidirectional analog signal path. Hybrids 184 and 186 may therefore be switched out of use by opening switch SWL, by placing switch SWD in position XD, by placing switch SWE in position XE, and by placing switch SWC in position YC. Microphone signals from line M may be routed to microphone input line 266 through switch SWC. Switch SWF may be closed to switch microphone noise reduction circuit 292 into use. Switch SWG may be placed in position YG to connect microphone 274 to microphone noise reduction circuit 292. Tone generator 294 can be used to transmit data from accessory 14 to device 12 in the form of ultrasonic tones. A tone detector in control circuitry 262 may receive and process the transmitted tone signals. Switch SWH may be placed in position XH and switch SWI may be placed in position YI. Switch SWJ may be placed in position YJ. With these switch positions, monaural audio may be routed from output 272 to speakers 276 and 278 in parallel. Power can be routed from line 268 to the POWER terminal in accessory 14 by placing switch SWB in position XB and switch SWK in position XK. The position of switch SWA is immaterial, because in monaural playback mode no right channel audio is provided to line 270.

If stereo playback and microphone ambient noise reduction are desired but not headphone ambient noise reduction, microphone path M may be configured as a bidirectional line to handle right channel audio and microphone audio while right channel line R may be used to convey power to accessory 14. In this type of arrangement, hybrids 184 and 186 may be switched into use to allow microphone line M to handle bidirectional analog signals. Microphone signals may be conveyed from microphone 274 to device 12 over line M while audio signals for right channel audio are routed to accessory 14 over line M. Low impedance power can be routed to accessory 14 over right channel path R.

To configure the circuitry of FIG. 6 in this way, switch SWA may be placed in position XA to route right channel audio to input 188 of hybrid 184. Switch SWL may be closed to connect the common port of hybrid 184 to microphone terminal M. Switch SWD may be placed in position YD to connect the common port of hybrid 186 to microphone line M. Switch SWE may be placed in position YE to connect the input of hybrid 186 to tone generator 294. Switch SWF may be closed to enable microphone noise reduction circuit 292. Switch SWG may be placed in position YG to connect microphone 274 to circuit 292. Switch SWC may be placed in position XC to route incoming microphone signals and ultrasonic tone signals from accessory 14 to terminal 266.

Switch SWB may be placed in position XB to route voltage Vcc from output 268 to accessory 14. In accessory 14, switch SWK may be placed in position XK to route power Vcc from line R to power terminal "POWER." The voltage on terminal "POWER" may be distributed to circuitry in accessory 14 that requires low-impedance power such as the microphone noise reduction circuitry 292, etc.

Outgoing left channel audio can be provided from output terminal 272 to speaker 278 via line L. Switch SWI may be placed in position XI to bypass circuit 286. Right channel audio may be bypassed around line R by routing output signals from output 270 to speaker 276 through the microphone line M and its associated hybrid circuitry. Switch SWJ may be placed in position XJ and switch SWH may be placed in position XH to handle the right channel signal from hybrid 186.

It may be desired to support a normal stereo playback mode in which no microphone ambient noise reduction and no headset ambient noise reduction are used. To support this type of operation, microphone line M may be placed in its unidirectional analog audio signal configuration. In particular, hybrids 184 and 186 may be switched out of use by opening switch SWL, by placing switch SWD in position XD, by placing switch SWE in position XE, and by placing switch SWC in position YC. Microphone signals from line M may be routed to microphone input line 266 through switch SWC. Switch SWF may be opened to disconnect microphone noise reduction circuit 292, while switch SWG is placed in position XG to bypass circuit 292. Tone generator 294 can be used to transmit user input commands from accessory 14 to device 12. A receiver in control circuitry 262 may receive and process the transmitted user input commands and other such data. Right channel line R is not needed to supply power from device 12 to accessory 14, so switch SWA may be placed in position YA, switch SWB may be placed in position YB, switch SWK may be placed in position YK, and switch SWH may be placed in position YH to route right channel audio over line R to speaker 276. Switch SWI may be placed in position XI to receive left channel audio from line L. Ambient noise reduction circuits 284 and 286 are not needed, so no low-impedance power is required from device 12.

Figure 7:
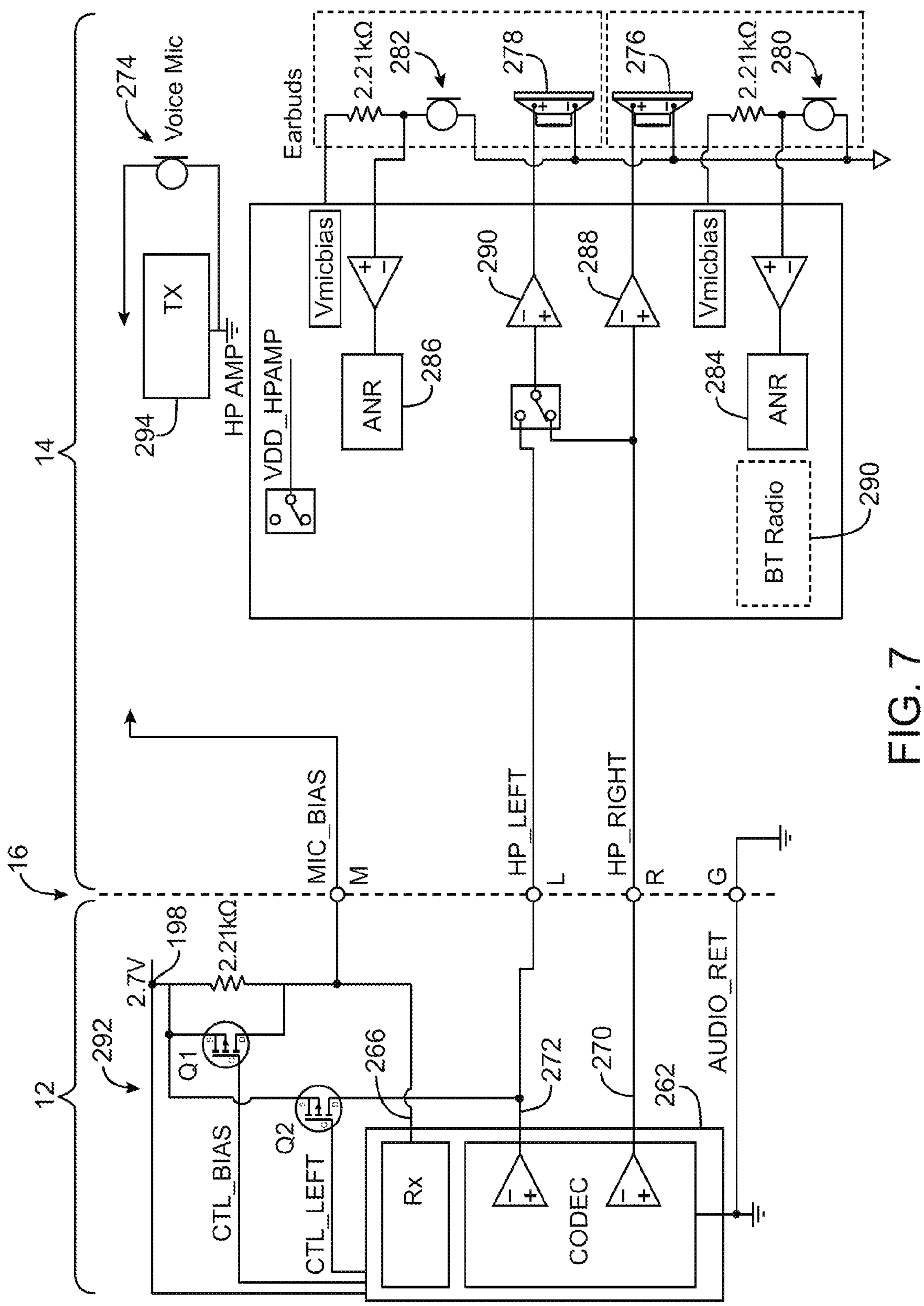
FIGS. 7 and 8 are circuit diagrams of additional illustrative path configuration circuitry and associated components in an illustrative electronic device and external circuitry such as a headset accessory in accordance with an embodiment of the present invention.
Figure 8:
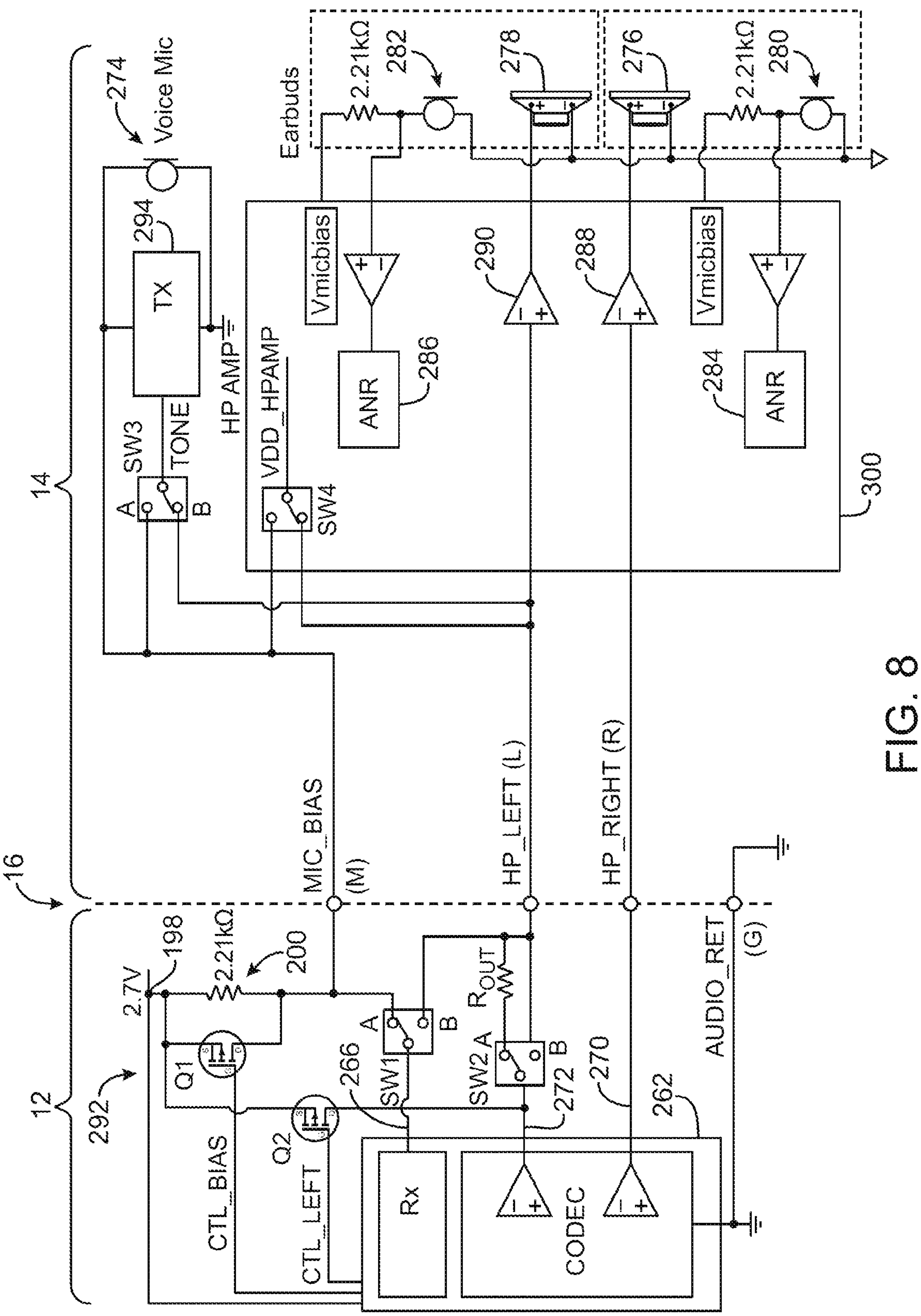

Additional possible configurations for an illustrative device 12 and accessory 14 are shown in FIGS. 7 and 8. As shown in FIG. 7, an optional wireless communications circuit such as a Bluetooth® transceiver 290 may be incorporated in accessory 14 if desired. Transceiver 290 may be used to handle any suitable digital data. For example, transceiver 290 may be used to communicate wirelessly with device 12.

Power can be switched to either the left audio channel path L or to the microphone line M when an appropriate headset or other accessory is detected. Accessory 14 may advertise its capabilities to device 12 by broadcasting ultrasonic tones or other information using transmitter 294. Accessory 14 may also receive optional configuration commands from device 12 that accessory 14 uses in determining how to adjust its internal circuitry to support various modes of operation. In device 12, power multiplexing circuitry 292 may be used to route low-impedance power to accessory 14 over the microphone line M when needed. Device 12 and accessory 14 of FIG. 7 may operate in a monaural noise cancellation mode, a stereo noise cancellation mode, and a stereo "classic" mode. These configurations may be implemented without using hybrids.

In monaural noise cancellation mode (e.g., when a user is on a voice call), a (high-impedance) microphone bias signal for voice microphone 274 may be provided to accessory 14 via microphone line M. At the same time, audio signals from output 270 may be routed to speakers 278 and 276 in parallel. Low-impedance power may be routed to the ambient noise reduction circuitry from power multiplexing circuitry 292 using line L.

In stereo noise cancellation mode, the left and right audio channels are driven discretely. Low-impedance power can be routed to ambient noise reduction circuits 286 and 284 using power multiplexing circuitry 292 and microphone line M. This makes the microphone line M unavailable for voice microphone signals and control tones from transmitter 294. Because there is no available audio connector contact or conductive line in path 16 with the FIG. 7 circuitry that is available to receive tones transmitted from transmitter 294, functions that require user control (e.g., using buttons on accessory 14 to transmit control signals to device 12) will not be supported. Nevertheless, the arrangement of FIG. 7 may help to conserve circuit resources by reducing the number of switches used in the path configuration circuitry.

In stereo "classic" mode, the switches in the path configuration circuitry of accessory 14 may be configured to bypass the automatic noise reduction circuits in accessory 14. Left and right channel audio signals that are generated by amplifiers in circuitry 262 may be routed directly to speakers 278 and 276, respectively.

The circuitry of the FIG. 8 arrangement may also be used to support monaural, stereo, and "classic" modes of the type described in connection with FIG. 7.

In monaural noise cancellation mode, power multiplexing (switching) circuitry 292 is configured to deliver power to microphone terminal M at 2.7 volts (as an example). In this operating mode, switch Q1 is off, switch Q2 is on, and switch SW1 is in position A. A 2.7 volt microphone bias voltage is provided to terminal M via resistor 200 to bias voice microphone 274, while microphone signals from voice microphone 274 and ultrasonic tones from transmitter 294 are routed to input 266 of circuit 262. At the same time, low-impedance power (i.e., 2.7 volt power that does not pass through resistor 200) may be routed to circuitry 300 via switch Q2 (which is on), and switch SW2 (which is in position A). Rout may be omitted or may have a resistance value lower than that of resistor 200 (if desired) to ensure that this source of power has an acceptably low impedance to supply a desired amount of power to circuitry 300. Because line L is being used to route low-impedance power to circuitry 300 (in this example), only monaural audio is conveyed from device 12 to accessory 14. In particular, line R may be used to convey monaural audio to amplifier 288 and other circuitry in accessory 14. Amplifier 290 can be bypassed.

In stereo noise cancellation mode, power multiplexer 292 is configured so that switch Q1 is on and switch Q2 is off. Switch SW1 may be placed in position B, switch SW2 may be placed in position A, and switch SW3 may be placed in position B. In this configuration, a low-impedance voltage of 2.7 volts is routed to microphone line M via switch Q1 (bypassing resistor 200). This power may be used by circuitry 300 (e.g., by adjusting internal switching circuitry such as switch SW4, etc.). Ultrasonic tone signals may be routed from transmitter 294 to input 266 of circuit 262 via left audio signal line L and switch SW1. Switch SW2 may be used to convey outgoing left channel audio signals from line 272 to amplifier 290. Right channel audio may be conveyed from line 270 to amplifier 288 via right channel line R.

When the circuitry of FIG. 8 is used in "classic" stereo headset mode, switches Q1 and Q2 may be turned off. If present in accessory 14, microphone 274 may be biased by power received through resistor 200. Switch SW3 may be placed in position B and switch SW1 may be placed in position B to route tone signals from transmitter 294 to line 266. Switch SW2 can be placed in position B to route left channel audio from device 12 to accessory 14 over left line L. Right channel audio can be routed to accessory 14 over right channel line R.

As the examples of FIGS. 7 and 8 demonstrate, path configuration circuitry can be used to reconfigure the lines in path 16 without using hybrids. However, an advantage of providing hybrids such as hybrids 184 and 186 on a line such as microphone line M to selectively configure line M as either a unidirectional analog audio signal path or a bidirectional analog audio signal path is that many or all operating functions may be preserved, even when lines in path are reconfigured. Hybrid arrangements may take advantage of the presence of the microphone bias on line M (e.g., power supply 234 and a 2.2 kilo-ohm resistor or other appropriate bias resistor such as bias resistor 200 of FIG. 5). When a voice microphone is used in accessory 14 such as microphone 274 of FIG. 6, an appropriate microphone bias signal is generally needed. In accessories without internal sources of power, it is convenient to receive the microphone bias signal from device 12 using microphone line M. When bidirectional communications are desired, the presence of the microphone bias circuitry in device 12 can be exploited to bias node 202 of hybrid circuitry 216 (FIG. 4).

Arrangements in which the microphone line M in path 16 is provided with hybrids and associated path configuration circuitry switches are merely illustrative. In general, any of the lines in path 16 (one, two, or more) can be provided with hybrids and associated switches to selectively configure these lines from unidirectional to bidirectional paths when desired. When paths are converted to bidirectional operation in this way, analog signals such as analog audio signals or digital signals may be routed across the bidirectional paths. This may free up additional lines in path 16 for handling analog signals such as analog audio signals from a voice microphone or an audio playback circuit, for handling digital signals (e.g., digital data for control, audio, video, sensor data, display data, etc.), and for handling power signals. The lines in path 16 may carry signals from device 12 to accessory 14, from accessory 14 to device 12, or bidirectionally. For example, power can be provided from device 12 to accessory 14 (e.g., when it is desired to power noise cancelling circuitry and other circuitry in an accessory that does not have appropriate local power sources) and power may be provided to device 12 from accessory 14 (e.g., when the device is connected to equipment in an automobile or home that is capable of providing power to charge a rechargeable battery in the device).

Figure 9:
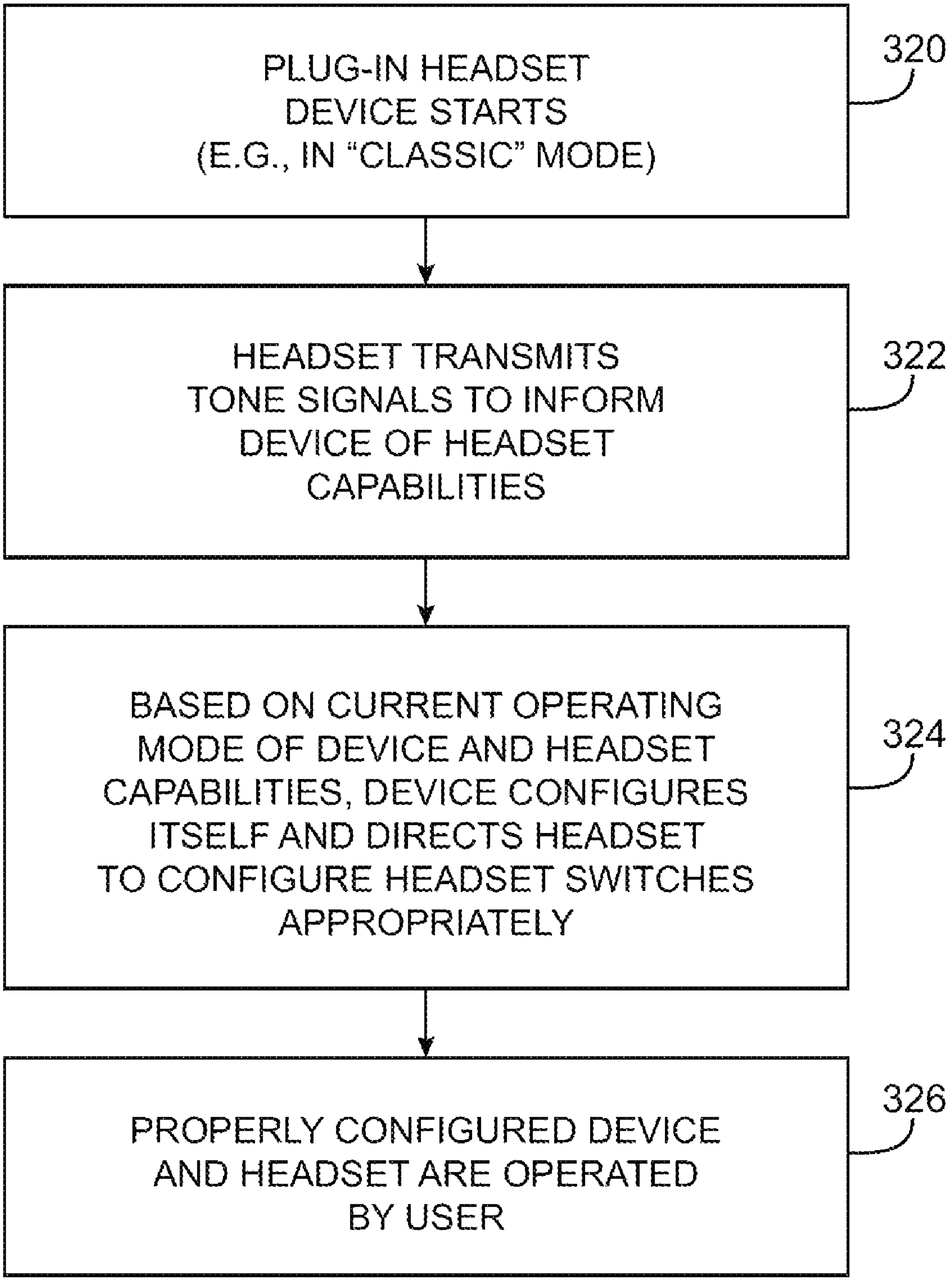
FIG. 9 is a flow chart of illustrative steps involved in operating an electronic device and external equipment such as a headset with path configuration circuitry in accordance with an embodiment of the present invention.

FIG. 9 shows illustrative steps involved in selectively reconfiguring a wired path between an electronic device and an associated accessory such as a headset to support various modes of operation.

At step 320, a user may plug a headset plug into a mating audio jack in electronic device 14. The electronic device 12 may contain a plug detection switch in its audio jack that detects the attachment of the headset. In response, the electronic device may initiate operations in a predetermined mode. The initial mode of operation for device 12 may be, for example, a stereo headset playback mode in which the microphone line is in its unidirectional state and in which no low-impedance power is delivered to the headset over the right and left audio channel lines.

At step 322, device 12 and headset 14 may begin to communicate. For example, headset 14 may transmit ultrasonic tones or other control signals to device 12 over the microphone path. These signals may serve to inform device 12 of the capabilities of headset 14 (e.g., whether headset 14 contains circuitry that requires low-impedance power such as ambient noise cancelling circuitry, etc.).

At step 324, in response to the received information on the headset's capabilities and in response to the current operating status of device 12 (e.g., the current application that is running on device 12), device 12 may adjust its path configuration circuitry to support a desired mode of operation. Device 12 may also transmit control signals (e.g., DC bias voltage levels, analog signals, digital signals, etc.) to accessory 14 to direct accessory 14 to enter a particular mode of operation by adjusting path configuration circuitry in accessory 14 appropriately. At step 326, device 12 and headset 14 may be used by the user. The lines in path 16 that have been placed into appropriate operating modes by the path configuration circuitry may be used to handle their signals (e.g., analog audio signals, digital signals, power signals, etc.). In a typical operating mode, the microphone line may be placed in a unidirectional mode to handle microphone and ultrasonic tone control signals that are passed from the headset to the device while the right and left audio channel lines in the wired path between the device and headset are used to convey played back stereo audio signals. In another typical operating mode, the microphone line may be placed in a bidirectional mode of operation to handle output audio (e.g., one of the channels of audio that would otherwise be routed across one of the right and left channel audio lines) at the same time as incoming microphone and ultrasonic tone signals. In this operating mode, a low-impedance voltage source may be used to supply power from the device to the headset over the audio channel line that has been made available by using the bidirectional microphone line. If desired, other operating modes may be used (e.g., to support mono audio playback, different types of ambient noise reduction, audio equalization, wireless functions, etc.). In general, any suitable signals may be routed over the lines in the wired communications path (e.g., analog, digital, power, etc.).

Figure 10:
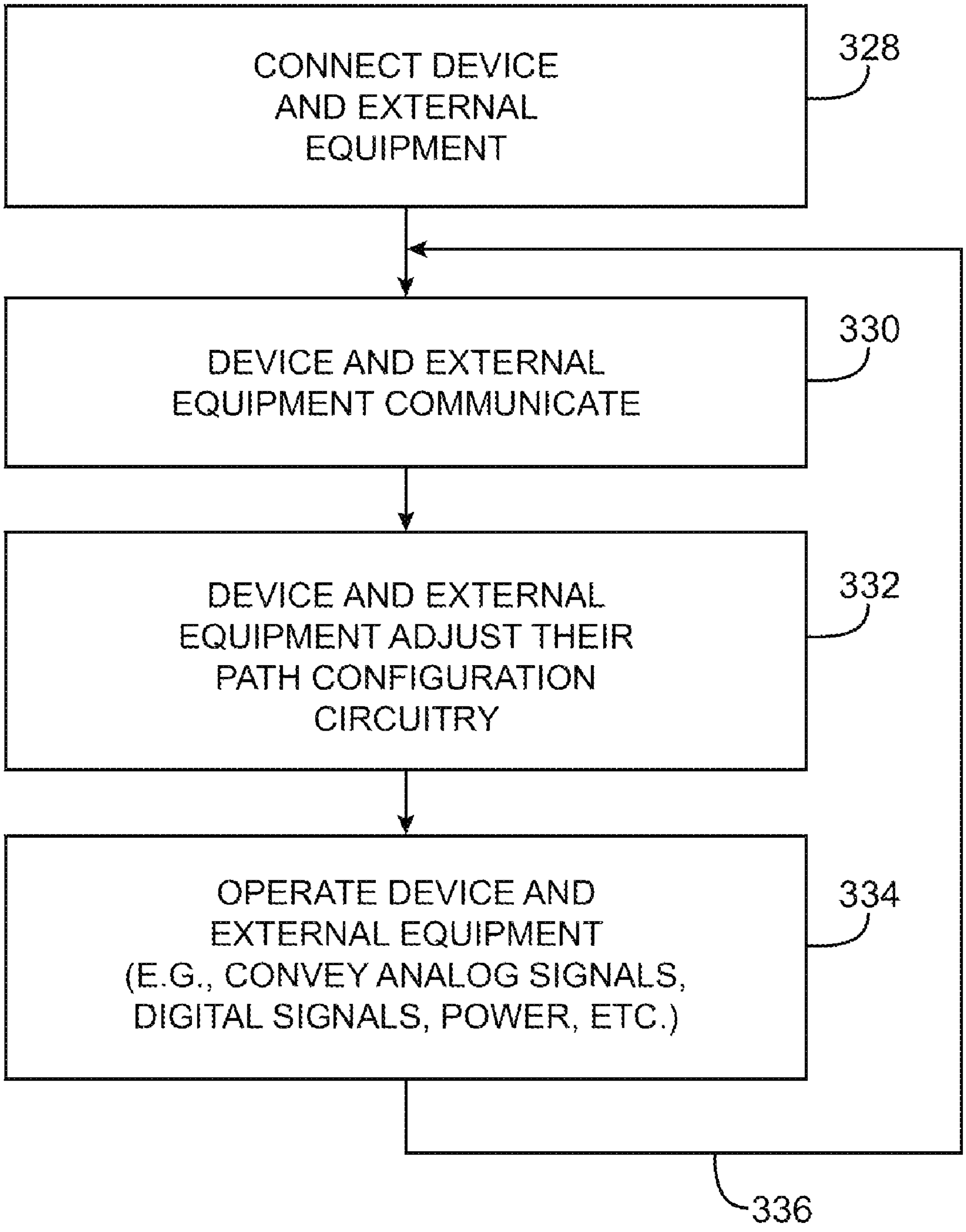
FIG. 10 is another flow chart of illustrative steps involved in operating an electronic device and external equipment with path configuration circuitry in accordance with an embodiment of the present invention.

FIG. 10 is a generalized flow chart showing illustrative steps involved in operating a device 12 and external equipment 14. The external equipment may be an accessory such as a headset or any other suitable circuitry that is external from device 12.

At step 328, device 12 may be connected to external equipment 14 by wired communications path 16. Wired communications path 16 may contain conductive lines such as a conductive microphone line, conductive left and right channel audio lines, and a ground line. Audio connectors such as jacks and plugs may be used. For example, device 12 may have a female audio connector with tip, ring, ring, and sleeve contacts connected to respective lines in the wired connector, whereas external equipment 14 may have corresponding audio connector contacts connected to the same lines.

At step 330, device 12 and external equipment 14 may communicate to share configuration information. For example, device 12 may inform equipment 14 of the capabilities and operating mode requirements for device 12. Similarly, external equipment 14 may inform device 12 of which functions are available in equipment 14. These communications may be performed using one or more DC voltages, analog transmissions (e.g., ultrasonic tone codes), digital communications, etc.

At step 332, device 12 and external equipment 14 may adjust their internal circuitry accordingly. This configures the switches and other circuits in device 12 and external equipment 14 so that hybrids are switched into use or out of use as appropriate and so that signals such as analog audio signals, digital signals, and power signals are routed appropriately through the lines of wired path. These signals may be conveyed using unidirectional lines and bidirectional lines (e.g., lines for which hybrids have been switched into use). The number of unidirectional and bidirectional lines may be adjusted by adjusting the circuitry of device 12 and external equipment 14 during step 332.

After placing the circuitry of device 12 and external equipment 14 in appropriate operating modes to accommodate desired signals over path 16, device 12 and external equipment 14 can be operated normally (step 334). During operation, changes to the functions of device 12 and/or external equipment 14 may dictate that further path configuration adjustments be made. In this situation, processing can loop back to step 330, as indicated by line 336.

The foregoing is merely illustrative of the principles of this invention and various modifications can be made by those skilled in the art without departing from the scope and spirit of the invention.

What is claimed is:

1. An audio connector port that is coupled to a wired path, comprising:

an audio connector;

path configuration circuitry coupled to the audio connector that supports communications over a microphone line in the wired path; and a hybrid having an input port, a common port, and an output port, wherein the common port is connected to the microphone line, wherein the path configuration circuitry is selectively configurable between:

a unidirectional path state in which analog microphone signals are conveyed over the microphone line without conveying counter-propagating analog audio signals; and a bidirectional path state in which analog microphone signals are conveyed over the microphone line while analog audio signals are simultaneously counter-propagated over the microphone line, wherein the path configuration circuitry comprises switching circuitry that selectively switches the hybrid out of use and into use to respectively switch between the unidirectional path state and the bidirectional path state.

2. The audio connector port defined in claim 1 further comprising:

a voltage source; and a resistor, wherein the resistor is connected between the voltage source and the microphone line.

3. The audio connector port defined in claim 2 wherein the hybrid comprises:

a summer having a negative input connected to the input port, a positive input connected to the common port, and an output connected to the output port; and a current source connected between the common port and a ground terminal.

4. The audio connector port defined in claim 1 wherein the audio connector comprises tip, ring, and sleeve contacts.

5. An electronic device that communicates with external equipment over a wired path that includes a microphone line, right and left channel audio lines, and a ground line, the electronic device comprising:

an audio connector having contacts that are respectively connected to the microphone line, right and left channel audio lines, and ground line in the wired path; and circuitry coupled to the audio connector, wherein the circuitry is selectively configured to:

operate in a first mode in which the circuitry receives analog microphone signals from the external equipment over the microphone line and does not receive power over the right and left channel audio lines in the wired path; and operate in a second mode in which audio signals are transmitted over the microphone line while power is received from the external equipment over at least one of the audio lines.

6. The electronic device defined in claim 5 further comprising a battery to which the power that is received from the external equipment in the second mode is provided.

7. The electronic device defined in claim 6 wherein the audio connector comprises tip, ring, and sleeve connectors.

8. The electronic device defined in claim 7 further comprising digital-to-analog converter and amplifier circuitry that plays back stereo audio signals over the right and left channel audio lines when the circuitry is configured to operate in the first mode.

9. A method of using an electronic device to communicate with an accessory through an audio connector having a microphone terminal, a ground terminal, and right and left channel audio terminals, comprising:

placing the electronic device in a first configuration in which analog microphone signals are received from the accessory over the microphone terminal, a direct current (DC) microphone bias voltage is provided from the electronic device to the accessory through the microphone terminal, right channel audio signals are provided from the electronic device to the accessory through the right channel audio terminal, and left channel audio signals are provided from the electronic device to the accessory through the left channel audio terminal;

placing the electronic device in a second configuration in which the analog microphone signals are received from the accessory over the microphone terminal while analog audio signals are transmitted to the accessory from the electronic device through the microphone terminal; and conveying a direct-current (DC) voltage through a given one of the audio channel terminals when the electronic device is in the second configuration.

10. The method defined in claim 9, wherein, when the electronic device is in the second configuration, the electronic device does not transmit analog audio signals to the accessory through the given one of the audio channel terminals.

11. An electronic device that supports communications with electronic equipment, comprising:

an audio connector having at least a microphone terminal, first and second audio channel terminals, and a ground terminal;

a voltage source that produces a voltage;

circuitry that supports bidirectional analog audio signal communications through the microphone terminal; and switching circuitry that is selectively configured to:

in a first mode of operation, route audio channel signals to the microphone terminal while routing the voltage to the first audio channel terminal; and in a second mode of operation, route the audio channel signals to the first audio channel terminal.

12. The electronic device defined in claim 11 wherein the circuitry comprises a hybrid having an input port, a common port, and an output port and wherein the common port is coupled to the microphone terminal.

13. The electronic device defined in claim 11 further comprising:

digital-to-analog converter and amplifier circuitry that produces the audio channel signals and that produces additional audio channel signals.

14. The electronic device defined in claim 13 further comprising supplying a microphone bias voltage to the microphone terminal through a resistor during the second mode of operation.

15. The electronic device defined in claim 14 further comprising supplying a microphone bias voltage to the microphone terminal through the resistor during the first mode of operation.

16. An electronic device that supports communications with external equipment over a wired path, comprising:

an audio connector that is coupled to the wired path and that has a microphone terminal, a ground terminal, a first audio signal terminal, and a second audio signal terminal; and circuitry that is selectively configured to operate in:

a first mode in which a direct-current (DC) voltage passes through the first audio signal terminal, first analog audio channel signals are transmitted through the microphone terminal, and second analog audio channel signals are transmitted through the second audio signal terminal; and a second mode in which the first analog audio signals are transmitted to the external equipment through the first audio signal terminal and the second analog audio signals are transmitted to the external equipment through the second audio signal terminal.

17. The electronic device defined in claim 16 further comprising a hybrid coupled to the microphone terminal.

18. The electronic device defined in claim 17 wherein the electronic device comprises a handheld electronic device with a digital-to-analog converter that plays back stereo audio, the electronic device further comprising a bias voltage source that supplies a bias voltage to the microphone terminal through at least one resistor.

19. The electronic device defined in claim 16 wherein the circuitry comprises power multiplexer circuitry that is selectively configured to route the direct-current voltage to the microphone terminal in the second mode.

20. An accessory to which an electronic device may be connected with a wired path, the accessory comprising:

an audio connector having a microphone terminal, a first audio channel signal terminal, a second audio channel signal terminal, and a ground terminal;

a voice microphone;

a hybrid having a common port connected to the microphone terminal, an input port that receives microphone signals from the voice microphone, and an output port; and circuitry connected to the audio connector that is selectively configured to:

receive analog audio signal through the first audio channel signal terminal in a first mode of operation; and receive a direct-current voltage through the first audio channel signal terminal, receive the analog audio signal through the microphone terminal, and transmit the microphone signals through the microphone terminal in a second mode of operation.

21. The accessory defined in claim 20 further comprising: ambient noise cancellation circuitry that is powered by the direct-current voltage during the second mode of operation.

22. The accessory defined in claim 21 wherein the accessory comprises a headset having first and second speakers and first and second noise cancellation microphones respectively associated with the first and second speakers, the accessory further comprising switching circuitry that selectively routes the received direct-current voltage from the audio channel signal terminal to the ambient noise cancellation circuitry during the second mode of operation.

23. The accessory defined in claim 22 wherein the switching circuitry is configured to route the received analog audio signal to the first and second speakers in parallel to support monaural operation during the second mode of operation.

24. The accessory defined in claim 20 further comprising an ultrasonic tone transmitter coupled to the microphone terminal.

* * * * *